US006533204B2

(12) United States Patent
Ishihara et al.

(10) Patent No.: US 6,533,204 B2
(45) Date of Patent: Mar. 18, 2003

(54) MAGNETIC TAPE CARTRIDGE

(75) Inventors: Yusuke Ishihara, Kanagawa-ken (JP);
Hideaki Shiga, Kanagawa-ken (JP);
Kiyoo Morita, Kanagawa (JP);
Daisuke Takahashi, Kanagawa-ken (JP); Seiji Tsuyuki, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/115,920

(22) Filed: Apr. 5, 2002

(65) Prior Publication Data

US 2002/0104913 A1 Aug. 8, 2002

Related U.S. Application Data

(62) Division of application No. 09/720,344, filed as application No. PCT/JP99/02965 on Dec. 22, 2000, now Pat. No. 6,435,439.

(30) Foreign Application Priority Data

Jun. 22, 1998 (JP) ............................................ 10-174503

(51) Int. Cl.$^7$ ................................................ G11B 23/07
(52) U.S. Cl. ................................... 242/348.2; 360/132
(58) Field of Search ........................ 242/348.2; 360/132

(56) References Cited

FOREIGN PATENT DOCUMENTS

JP          9-274785 A      10/1997

*Primary Examiner*—John Q. Nguyen
(74) *Attorney, Agent, or Firm*—Sughrue Mion, PLLC

(57) ABSTRACT

A magnetic tape cartridge includes a cartridge casing, a single reel which is housed in the cartridge casing for rotation and around which a magnetic tape is wound, the leader pin which is fixed to the leading end of the magnetic tape in order to draw out the magnetic tape from the cartridge casing, a lock member which is adapted to removably hold opposite ends of the leader pin inside an opening of the cartridge casing, and a sliding door for opening and closing the opening. A recess is formed on the inner surface of the sliding door at least at a part opposed to the front end of the lock member so that the front end of the lock member is prevented from interfering with the sliding door, whereby leader pin holding action by the lock member and opening and closing of the sliding door are stabilized and reliability of the magnetic tape cartridge is improved.

4 Claims, 26 Drawing Sheets

F I G. 13A
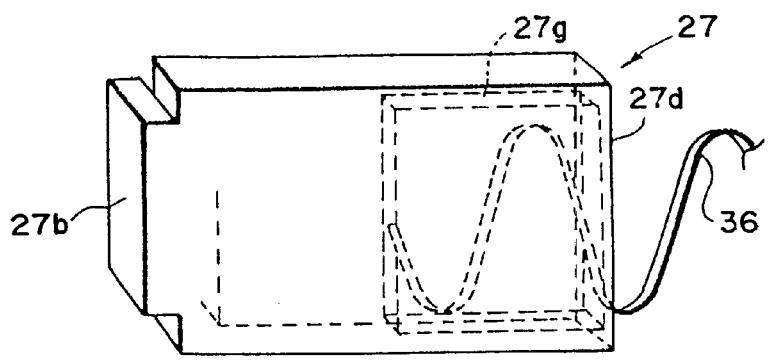
F I G. 13B
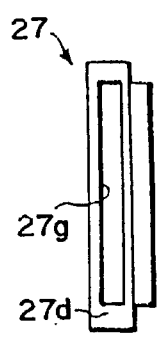
F I G. 14
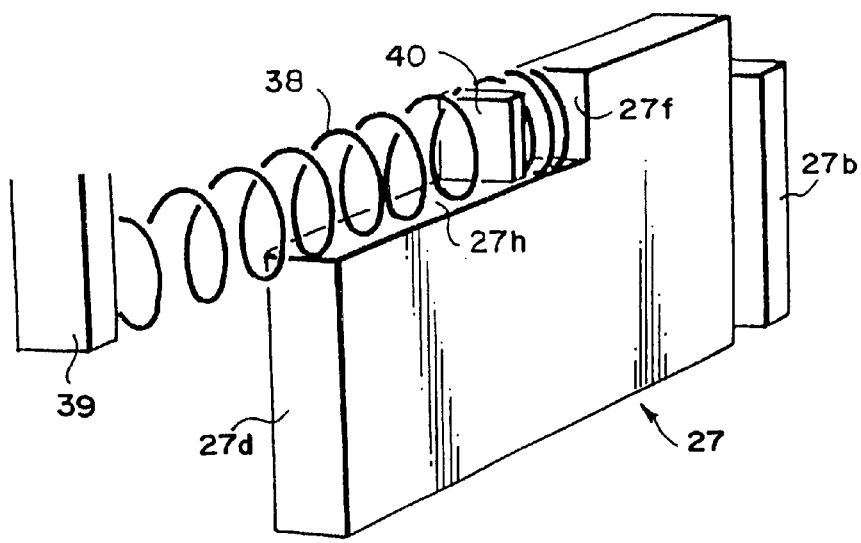

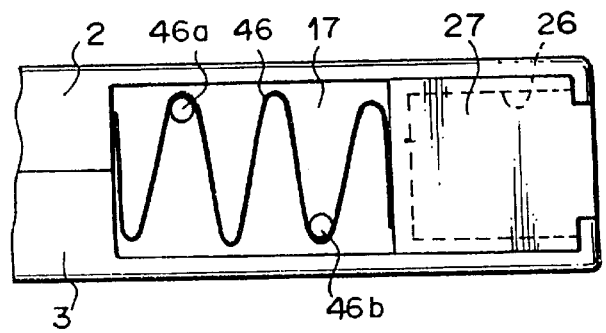
F I G. 19A
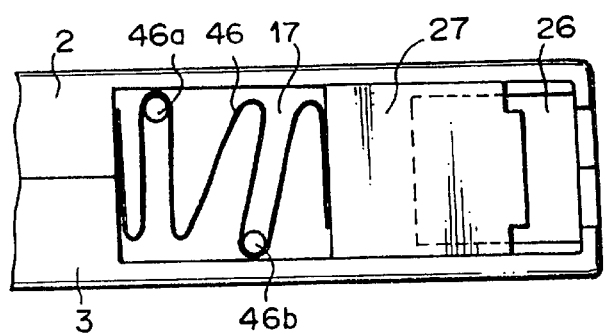
F I G. 19B
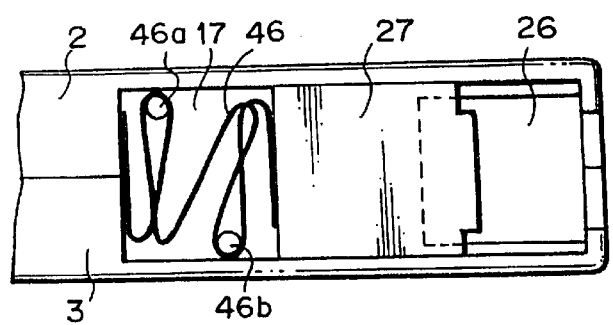
F I G. 19C
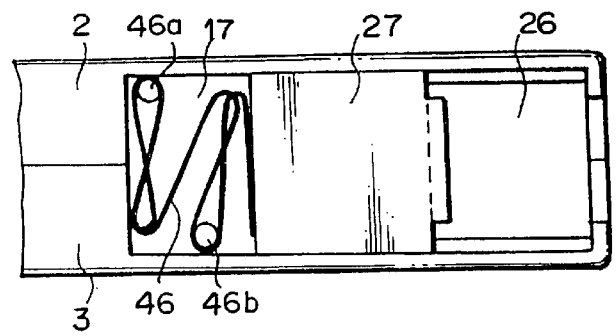
F I G. 19D F I G. 20A
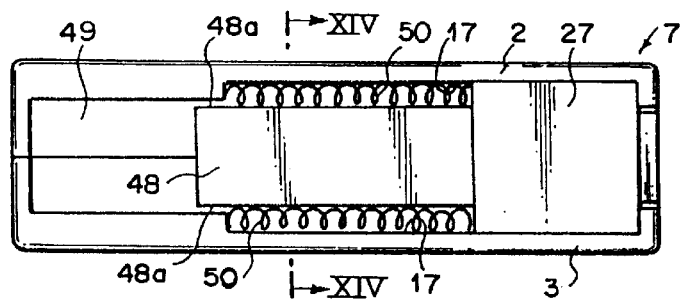
F I G. 20B
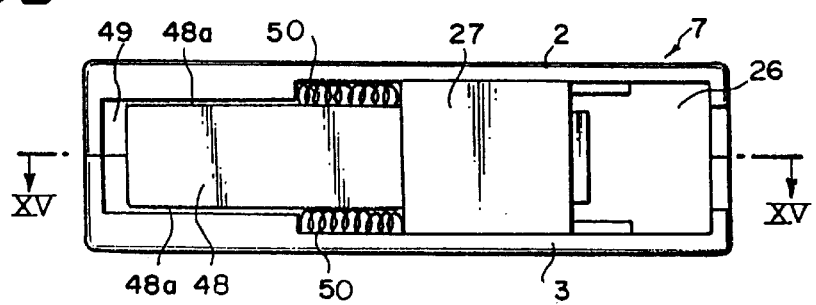
F I G. 21
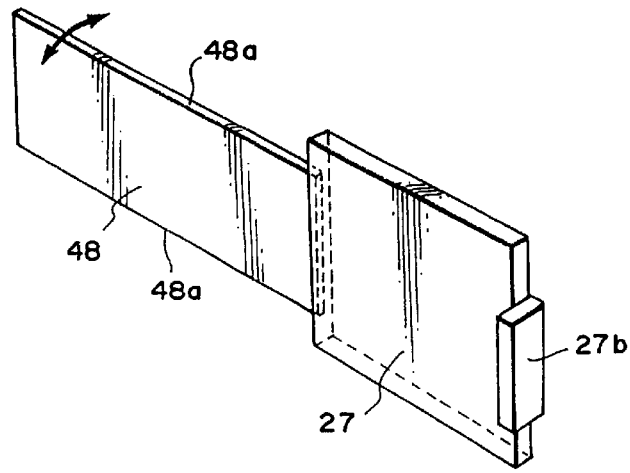

F I G. 24A
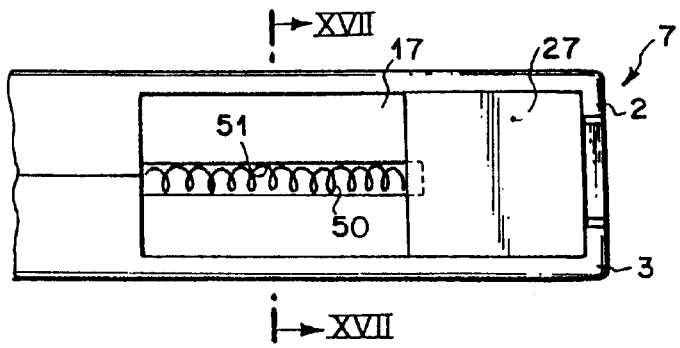
F I G. 24B
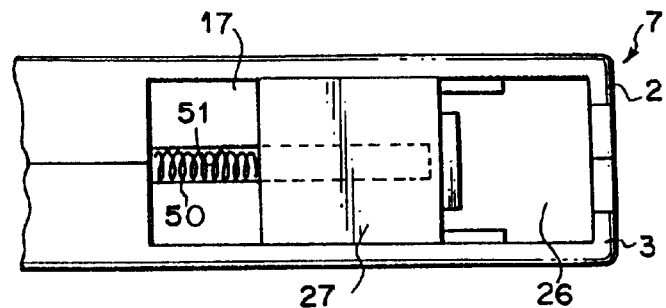
F I G. 25
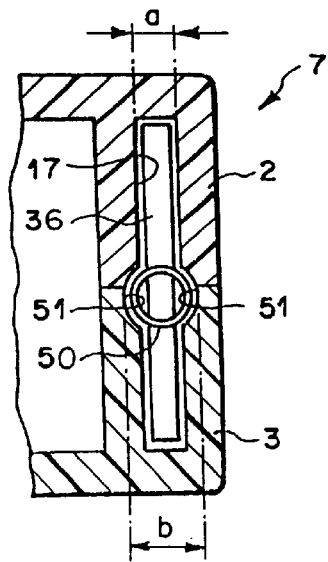

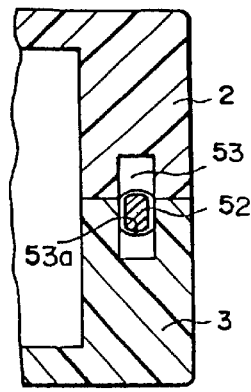
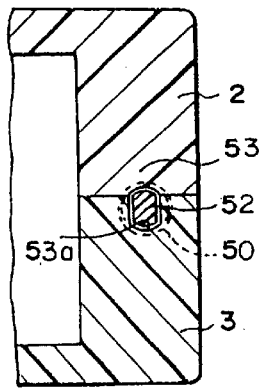
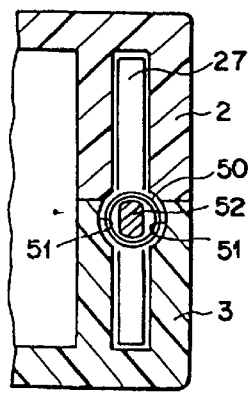
FIG. 29A  FIG. 29B  FIG. 29C
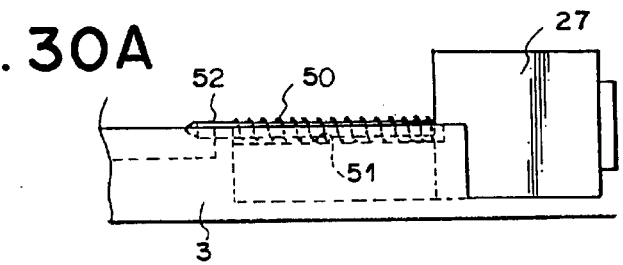
FIG. 30A
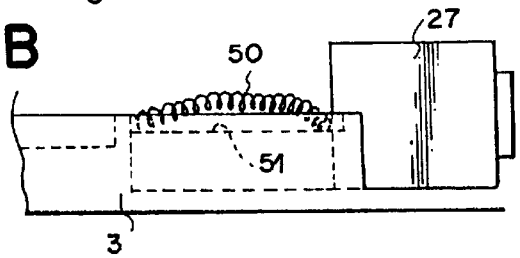
FIG. 30B
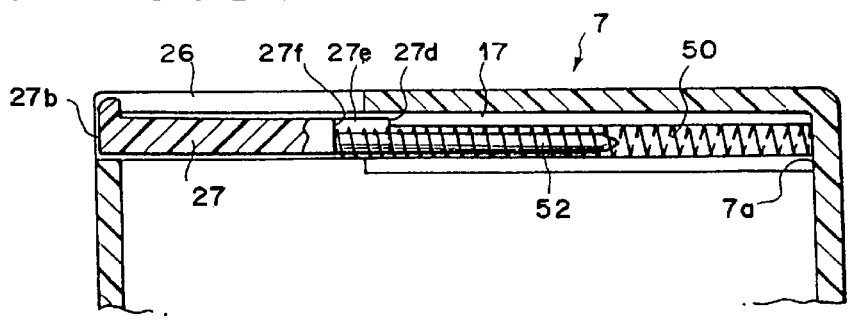
FIG. 31

F I G. 32
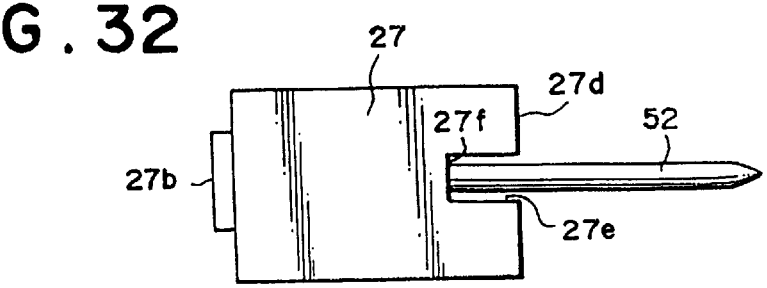
F I G. 33
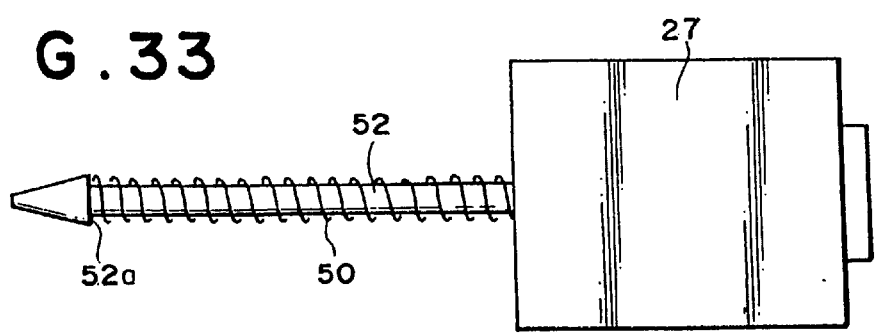
F I G. 34A
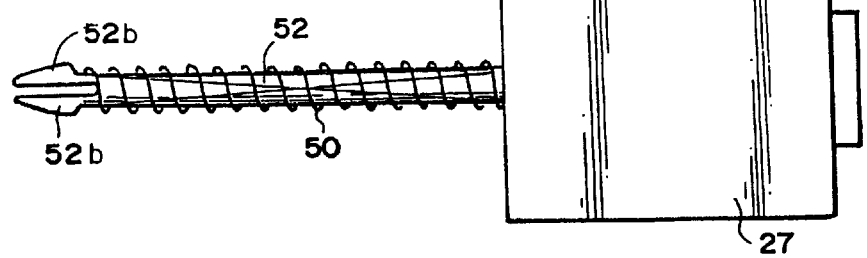
F I G. 34B
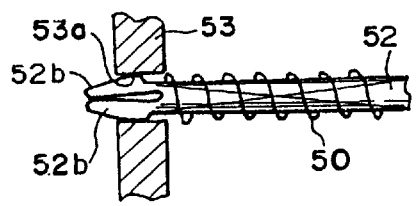
F I G. 34C
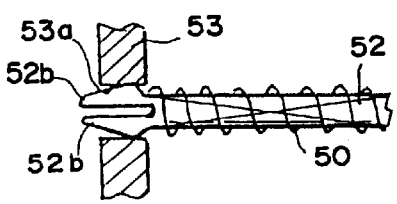

FIG. 35
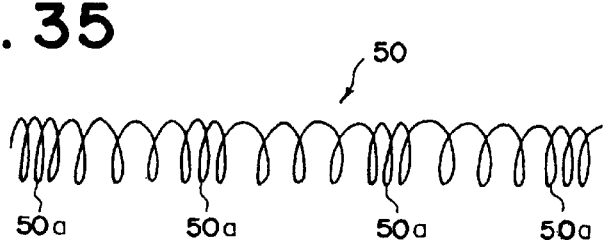
FIG. 36A   FIG. 36B   FIG. 36C
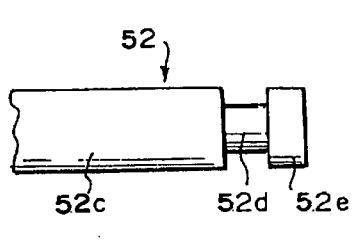   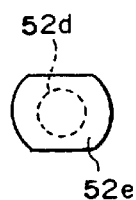   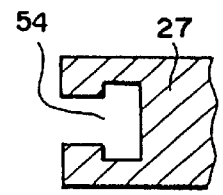
FIG. 37
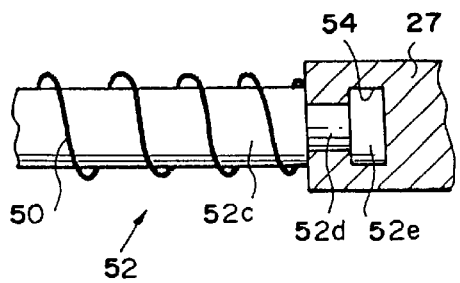

F I G. 42A
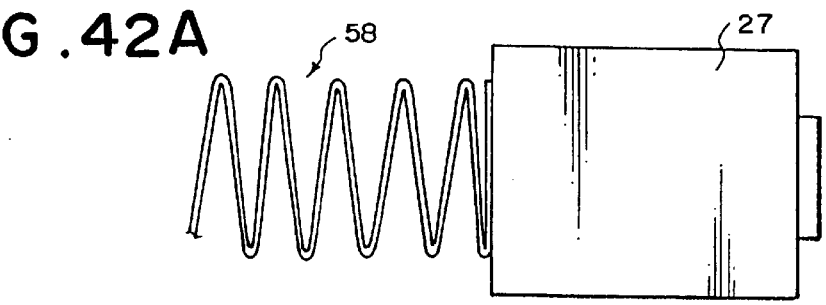
F I G. 42B
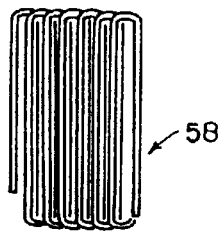
F I G. 43A
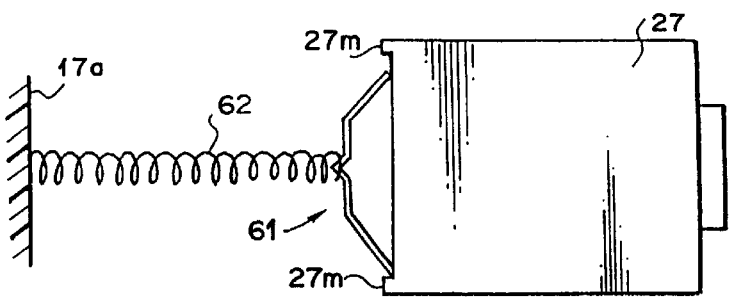
F I G. 43B
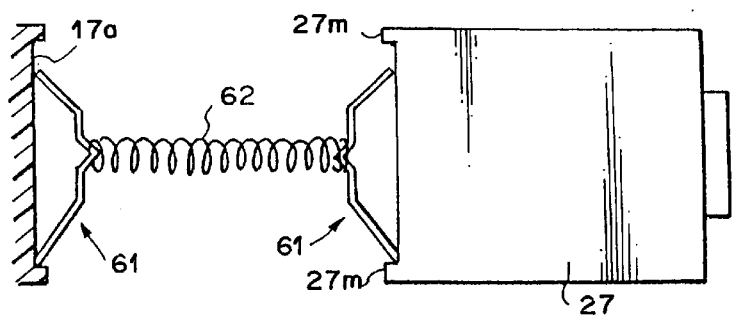

F I G . 44
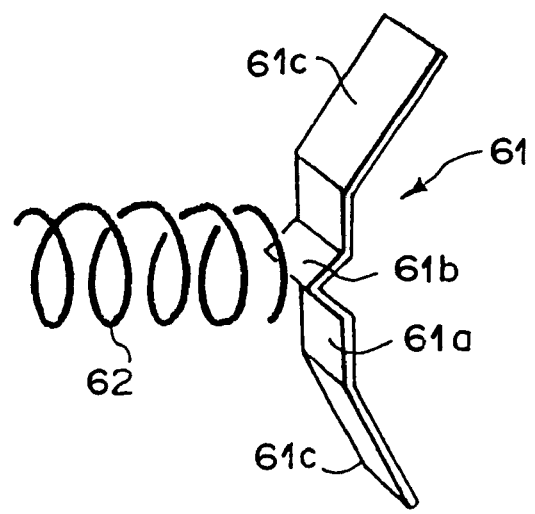

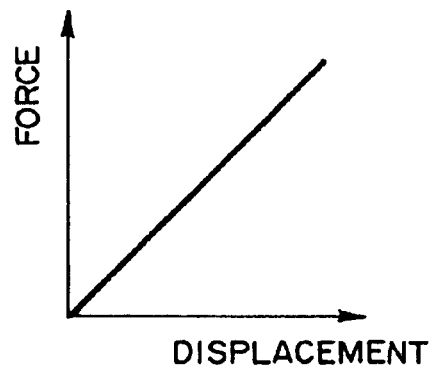
F I G. 45A
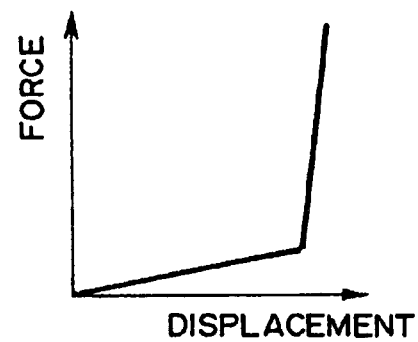
F I G. 45B
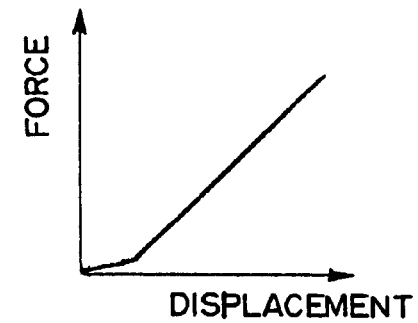
F I G. 45C

MAGNETIC TAPE CARTRIDGE

This is a divisional of application Ser. No. 09/720,344 filed Dec. 2, 2000, U.S. Pat. No. 6,435,439, which is a 371 of PCT/JP99/02965 filed Jun. 3, 1999; the disclosure of which is incorporated herein by reference.

FIELD OF THE INVENTION

This invention relates to a magnetic tape cartridge, and more particularly to a structure of a sliding door for opening and closing an opening for accommodating a leader pin and a structure for urging the sliding door in a magnetic tape cartridge comprising a cartridge casing, a single reel which is housed in the cartridge casing for rotation and around which a magnetic tape is wound, and the leader pin which is fixed to the leading end of the magnetic tape in order to draw out the magnetic tape from the cartridge casing.

BACKGROUND OF THE INVENTION

As a recording medium for use in an external memory of a computer or the like, there has been known a magnetic tape cartridge comprising a magnetic tape wound around a single reel and a cartridge casing in which the reel is housed for rotation. Since the magnetic tape is used for storing data in a computer or the like and important information is stored on the magnetic tape, the magnetic tape cartridge is structured so that trouble such as tape jam does not occur and the magnetic tape is not accidentally drawn out.

A leader member (a leader pin in the present invention) is fixed to the leading end of the magnetic tape and the recording and reproducing apparatus is arranged to catch the leader member to draw out the magnetic tape from the magnetic tape cartridge and to rewind the magnetic tape into the magnetic tape cartridge. The leader pin is removably held inside an opening of the cartridge casing which is opened and closed by a sliding door. It is preferred that a lock member which firmly holds the both ends of the leader pin be provided so that the leader pin can be held in a predetermined position.

It is necessary to stabilize leader pin holding and releasing action of the lock member and sliding door opening and closing action in order to improve reliability of the magnetic tape cartridge.

That is, when the magnetic tape, which has been drawn out form the cartridge casing, is rewound around the reel and the leader pin is stored inside the opening of the cartridge casing, the lock member is brought into abutment against the leader pin to be deformed or displaced, and is returned to its original shape or position to be brought into engagement with the leader pin after the leader pin is moved to a predetermined rest position in which the leader pin is stored. In this case, it is preferred from the viewpoint of stabilizing the leader pin holding action of the lock member that the entrance part of the lock member which is first brought into contact with the leader pin be gently inclined. However, when the inclination of the entrance part of the lock member is gentle, the lock member is apt to be long and it becomes necessary to position the lock member to project toward the opening. The position in which the leader pin enters the cartridge casing (will be referred to as "the leader pin introduction position", hereinbelow) slightly varies in the direction of width of the opening, and accordingly, the entrance part of the lock member must permit variation of the leader pin introduction position over a sufficient range. Also for the purpose of this point, it is preferred that the entrance part of the lock member be positioned to project toward the opening. When the entrance part projects toward the opening, there arises fear that the entrance part interferes with the sliding door.

It is preferred that the rest position of the leader pin be near to the opening since the leader pin holding member of the recording and reproducing apparatus which catches the leader pin is inserted through the opening to be brought into engagement with the leader pin. As a result, the lock member is disposed near to the opening and the sliding door. Accordingly, when drop impact acts on the magnetic tape cartridge, there is fear that the lock member comes to interfere with the inner surface of the sliding door to disable the sliding door from being opened, which deteriorates the reliability of the magnetic tape cartridge.

Further, when impact acts on the magnetic tape cartridge in the state where the leader pin is held in the rest position, e.g., while the magnetic tape cartridge is stored or being transported, with the magnetic tape slackened, the leader pin can be released from the lock member or can come to be held by the lock member in a wrong position deviated from the rest position. When the leader pin is once shifted from the correct rest position, there is no force acting on the leader pin to return it to the correct rest position, and the leader pin is kept deviated from the correct rest position. Accordingly, when the magnetic tape cartridge is subsequently loaded in a recording and reproducing apparatus, the leader pin holding member cannot hold the leader in the correct position, which causes trouble in operation of the recording and reproducing apparatus and deteriorates the reliability of the magnetic tape cartridge.

Further, it is necessary to provide on the sliding passage of the sliding door a spring member for urging the sliding door toward its closing position. However the sliding stroke of the sliding door is relatively long, and it is difficult to dispose a spring member conforming to such a long sliding stroke of the sliding door in a limited space, which makes it difficult to obtain desired spring characteristic.

Further, use of a coiled spring which is large in length/diameter ratio as the spring member gives rise to a problem that since the coiled spring is incorporated in the cartridge casing in a slightly compressed state, the coiled spring can buckle to spring back out of the predetermined position or to be pinched between upper and lower casing halves forming the cartridge casing, which deteriorates assembling facility of the magnetic tape cartridge.

In view of the foregoing observations and description, the primary object of the present invention is to provide a magnetic tape cartridge in which reliability of leader pin holding action of the lock member and reliability of the sliding door opening and closing action can be ensured.

SUMMARY OF THE INVENTION

The object of the present invention can be accomplished by a magnetic tape cartridge comprising a cartridge casing, a single reel which is housed in the cartridge casing for rotation and around which a magnetic tape is wound, the leader pin which is fixed to the leading end of the magnetic tape in order to draw out the magnetic tape from the cartridge casing, a lock member which is adapted to removably hold opposite ends of the leader pin inside an opening of the cartridge casing, and a sliding door for opening and closing the opening, wherein a recess is formed on the inner surface of the sliding door at least at a part opposed to the lock member.

It is preferred that the recess be formed so that the recess on the front end of the sliding door is closed by a wall surface of the cartridge casing when the sliding door is closed. The lock member may comprise upper and lower parts which are formed of a wire spring or a plate spring integrally with each other or separately from each other.

In accordance with the magnetic tape cartridge described above, by virtue of the recess formed on the inner surface of the sliding door at least at a part opposed to the lock member, interference of the lock member with the sliding door can be prevented and generation of failure in opening and closing the sliding door can be prevented. Further, freedom in the shape of the lock member is increased and the entrance portion of the lock member against which the leader pin is first brought into abutment can be gentle in inclination and sufficient in width, whereby leader pin holding action can be stabilized and reliability of the magnetic tape cartridge can be improved.

When the recess on the front end of the sliding door is closed by a wall surface of the cartridge casing when the sliding door is closed, dirt and dust are preventing from entering the cartridge casing and deterioration of recording quality can be prevented.

In a magnetic tape cartridge in accordance with another embodiment of the present invention, the inner surface of the sliding door is provided with a protrusion which prevents the leader pin from being released from the lock member in a state where the sliding is closed.

It is preferred that the height of the protrusion be set so that the distance between the top surface of the protrusion and the leader pin is not larger than the distance between the center of the leader pin and the contact point of the leader pin and the lock member as measured in the direction of movement of the leader pin toward the opening. Further, it is preferred that the protrusion be formed in a position where the protrusion cannot interfere with the lock member. The protrusion may be formed to extend toward the front end of the sliding door.

In accordance with the magnetic tape cartridge described above, by virtue of the protrusion formed on the inner surface of the sliding door, the leader pin can be prevented from being released from the lock members even if the leader pin is subjected to a force urging the leader pin away from the rest position, for instance, when the magnetic tape cartridge is dropped on the floor while it is stored or transported with the sliding door closed, whereby the leader pin can be surely caught in the correct position by the tape drive system and reliability of the magnetic tape cartridge can be improved.

In a magnetic tape cartridge in accordance with still another embodiment of the present invention, a coiled spring member extends through the sliding passage of the sliding door and a hole extending from the sliding passage in the direction in which the sliding door is opened along the mating surfaces of the upper and lower casing halves, and a plug is inserted into the hole to push the end of the coiled spring member remote from the sliding door so that the coiled spring urges the sliding door to its closing position.

It is preferred that the hole is formed by a pair of grooves which are respectively formed on the mating surfaces of the upper and lower casing halves of the side wall of the cartridge casing, in which the opening is formed, to extend from the rear end face of the sliding passage of the sliding door in the direction in which the sliding door is opened and open in a side wall of the cartridge casing which is adjacent to the side wall and extends in perpendicular to the side wall. Further, the groove may be formed on each of the mating surfaces or one of the mating surfaces. Further, it is preferred that the plug be provided with a resilient projection formed on the outer surface thereof and a recess which is adapted to be engaged with the projection and hold the plug in a predetermined position be formed on the inner surface of the recess. For example, a wedge-like projection may be formed on the outer surface of a shaft portion of the plug near the base end thereof and a slit may be formed in the shaft portion inside the projection to extend in the axial direction of the shaft portion so that the slit provides resiliency to the projection. Further, the plug may be provided with a large diameter portion which forms a shoulder between it and a shaft portion of the plug, and the hole may be provided with a large diameter portion for receiving the large diameter portion of the plug. Further, a projection may be formed on the outer surface of a shaft portion of the plug at the front end thereof and the front end portion of the shaft portion may be bifurcated to provide resiliency to the projection. It is preferred that a thin shaft portion which is inserted into the coiled spring member be provided to extend from the front end of the plug.

In accordance with the magnetic tape cartridge described above, since force urging the sliding door to the closing position is not generated until the plug is inserted into the hole, assembly of the cartridge casing and incorporation of the sliding door and the spring member in the cartridge casing are facilitated.

In a magnetic tape cartridge in accordance with still another embodiment of the present invention, a spring member for urging the sliding door to its closing position is provided in the sliding passage of the sliding door with the spring member partly received in a recess formed in the sliding door.

It is preferred that the spring member is a corrugated plate spring. The recess may be formed on the inner side of the sliding door or the recess may be like a blind hole which opens in the rear end face of the sliding door. A recess may be formed on the sliding door by cutting away a part of the sliding door and the spring member in the form of a coiled spring may be received in the recess.

In a magnetic tape cartridge in accordance with still another embodiment of the present invention, a plurality of spring elements which are different in strength are arranged in series along the sliding passage of the sliding door to urge the sliding door to its closing position.

In a magnetic tape cartridge in accordance with still another embodiment of the present invention, a plurality of spring elements which are different in strength are arranged in parallel along the sliding passage of the sliding door to urge the sliding door to its closing position.

In a magnetic tape cartridge in accordance with still another embodiment of the present invention, a spring member for urging the sliding door to its closing position comprises a plurality of elastic ring members which are arranged in series along the door passage.

The spring member may comprise a plurality of helical elastic members.

In a magnetic tape cartridge in accordance with still another embodiment of the present invention, a spring member for urging the sliding door to its closing position comprises a corrugated wire spring having at least one coiled portion.

In a magnetic tape cartridge in accordance with still another embodiment of the present invention, a spring retainer plate which has upper and lower edges which are substantially parallel to the direction of sliding movement of the sliding door is mounted on the sliding door to extend in the sliding passage of the sliding door and a spring member in the form of a coiled spring for urging the sliding door to its closing position is contained in a space surrounded by the edge of the spring retainer plate and a wall defining the door passage.

It is preferred that the spring retainer plate be flexible.

In a magnetic tape cartridge in accordance with still another embodiment of the present invention, a pair of grooves are formed on opposite side walls of the sliding passage of the sliding door to extend in the direction of the sliding movement of the sliding door opposed to each other and a coiled spring member for urging the sliding door in its closing position is contained in the space formed between the grooves.

The grooves may be formed on an upper casing half or a lower casing half of the cartridge casing.

In a magnetic tape cartridge in accordance with still another embodiment of the present invention, a spring support rod which extends in the sliding passage of the sliding door in parallel to the direction of sliding movement of the sliding door is attached to the sliding door and a coiled spring member for urging the sliding door in its closing position is fitted on the spring support rod.

A spring receiving space which is wider than the space between opposite side walls of the sliding passage of the sliding door may be provided. The spring support rod may be provided with a flat surface on a side surface thereof and an axial hole into which the spring support rod is inserted may conform to the spring support rod in cross-sectional shape. A part of the coiled spring member may be received in a recess formed in the sliding door. The spring support rod may be provided at its free end with a projection for tacking the coiled spring member on the rod. The projection may be divided into a plurality of resilient pieces. The spring support rod may be provided with a pair of flat portions on opposite sides thereof, and an axial hole into which the spring support rod is inserted may be of such a diameter that permits insertion of the spring support rod without deformation of the resilient pieces. The coiled spring may be provided with a plurality of close winding portions. Further, the spring support rod may be formed integrally with the sliding door or formed separately from the sliding door.

In a magnetic tape cartridge in accordance with still another embodiment of the present invention, a door unit having a casing in which a sliding door for opening and closing the opening of the cartridge casing and a spring member for urging the sliding door to its closing position are incorporated is mounted on one side of the cartridge casing.

It is preferred that an engagement means which tacks the sliding door in a predetermined position overcoming the urging force of the spring member be provided between the casing of the door unit and the sliding door. The engagement means may comprise a pair of engagement projections formed on the top surface and the bottom surface of the sliding passage of the sliding door and a pair of engagement recesses formed on the upper and lower edges of the sliding door.

In a magnetic tape cartridge in accordance with still another embodiment of the present invention, a spring member for urging the sliding door to its closing position comprises a corrugated wire spring and the end portion of the wire spring is bent in the direction of width of the sliding door.

In a magnetic tape cartridge in accordance with still another embodiment of the present invention, a spring member for urging the sliding door to its closing position comprises a coiled spring having an annular portion which conforms to a rectangular or ellipsoidal cross-section of the sliding passage of the sliding door.

In a magnetic tape cartridge in accordance with still another embodiment of the present invention, a spring member for urging the sliding door to its closing position comprises a coiled spring extending in the direction of the sliding movement of the sliding door and a plate spring connected to at least one end of the coiled spring.

In accordance with the magnetic tape cartridges provided with the spring members described above, a spring member having a necessary stroke can be compactly incorporated and opening and closing of the sliding door can be stabilized, whereby reliability of the magnetic tape cartridge can be improved.

BRIEF DESCRIPTION OF THE DRAWINGS

FIG. 13A is a modification of the sliding door shown in FIG. 12A, FIG. 13B is a side view of the sliding door shown in FIG. 13A as seen from the rear, FIG. 14 is a schematic perspective view showing a spring member of a second embodiment, FIG. 19A is a schematic front view of the magnetic tape cartridge showing a spring member of a seventh embodiment with the sliding door closed, FIG. 19B is a front view similar to FIG. 19A but with the sliding door slightly opened, FIG. 19C is a front view similar to FIG. 19A but with the sliding door more opened, FIG. 19D is a front view similar to FIG. 19A but with the sliding door further more opened, FIG. 20A is a schematic front view of the magnetic tape cartridge showing a spring member of an eighth embodiment with the sliding door closed, FIG. 20B is a front view similar to FIG. 20A but with the sliding door opened, FIG. 21 is a perspective view of a sliding door with a spring retainer plate, FIG. 24A is a schematic front view of the magnetic tape cartridge showing a spring member of a ninth embodiment with the sliding door closed, FIG. 24B is a front view similar to FIG. 24A but with the sliding door opened, FIG. 25 is a cross-sectional view taken along line XVII—XVII in FIG. 24A, FIG. 29A is a cross-sectional view taken along line A—A in FIG. 28, FIG. 29B is a cross-sectional view taken along line B—B in FIG. 28, FIG. 29C is a cross-sectional view taken along line C—C in FIG. 28, FIG. 30A is a view for illustrating the effect of the tenth embodiment, FIG. 30B is a view for illustrating a comparative example, FIG. 31 is a cross-sectional view showing the state where the spring support rod shown in FIG. 27A is formed to project from the bottom surface of the recess, FIG. 32 is a front view of the sliding door in FIG. 31, FIG. 33 is a front view showing a modification of the spring support rod shown in FIG. 27A, FIGS. 34A is a front view showing a modification of the spring support rod shown in FIG. 33, FIG. 34B is a cross-sectional view showing a state where the front end portion of the spring support rod shown in FIG. 34A is inserted into an axial hole of a small diameter, FIG. 34C is a cross-sectional view showing a state where the front end portion of the spring support rod shown in FIG. 34A is inserted into an axial hole of a large diameter, FIG. 35 is a front view showing a modification of the coiled spring shown in FIG. 34A, FIG. 36A is a fragmentary plan view of an important part of the rod when the rod is formed separately from the sliding door, FIG. 36B is a side view of FIG. 36A, FIG. 36C is a fragmentary cross-sectional view of an important part of the sliding door when the rod is formed separately from the sliding door, FIG. 37 is a side view partly in cross-section showing the spring support rod of FIG. 36A fixed to the sliding door of FIG. 36C, FIG. 42A is a front view of a spring member of a thirteenth embodiment, FIG. 42B is a perspective view of the spring member shown in FIG. 42A, FIG. 43A is a front view of a spring member of a fourteenth embodiment, FIG. 43B is a front view showing a modification of the spring member shown in FIG. 43A, FIG. 44 is an exploded perspective of the spring member shown in FIG. 43A, FIG. 45A is a view for illustrating the effect of the fourteenth embodiment and shows a spring characteristic of the spring member when the spring member is formed solely by a coiled spring, FIG. 45B shows a spring characteristic of the spring member when the spring member is formed by a combination of a coiled spring and a plate spring, and FIG. 45C shows a spring characteristic of the spring member when the spring member is formed by another combination of a coiled spring and a plate spring.

PREFERRED EMBODIMENTS OF THE INVENTION

Figure 1:
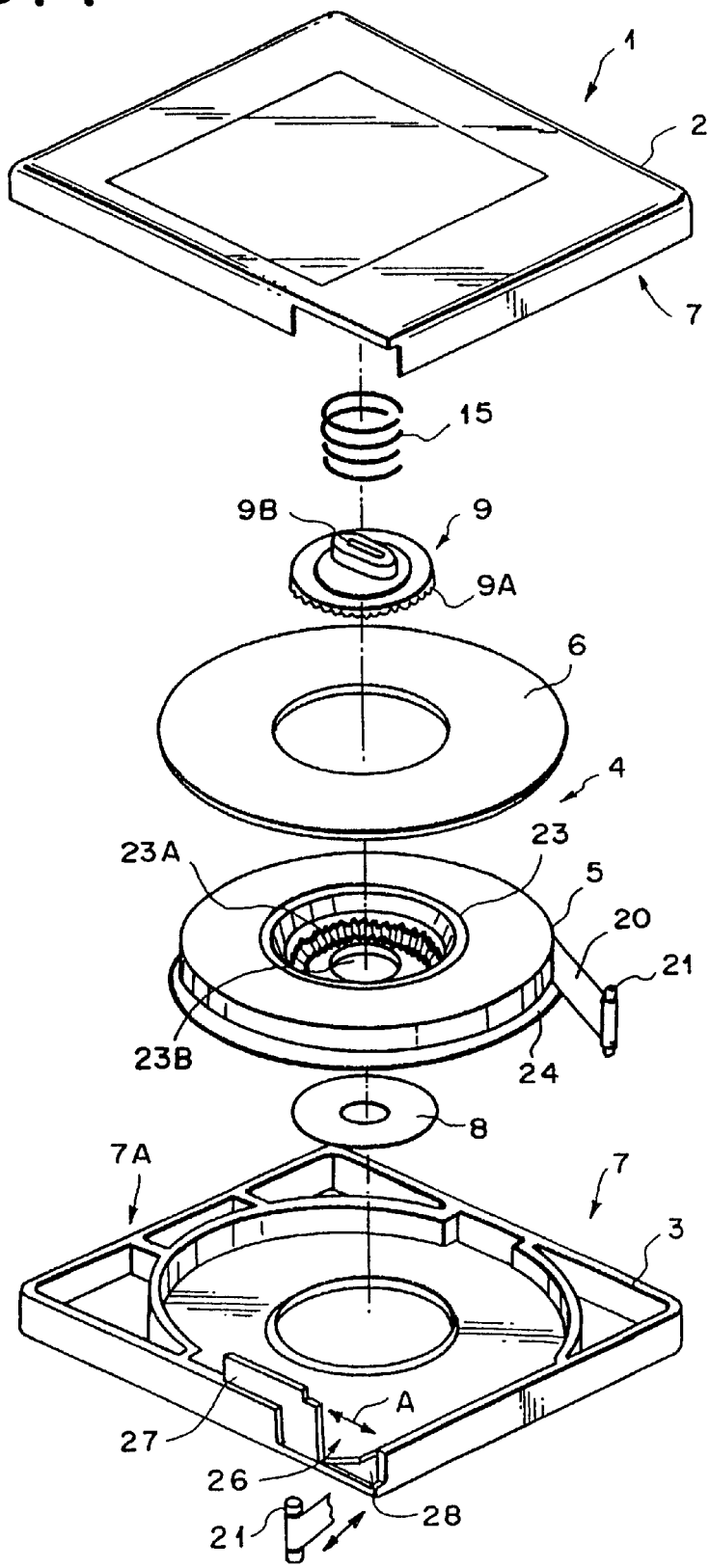
FIG. 1 is an exploded perspective view of a magnetic tape cartridge in accordance with a first embodiment of the present invention.

The present invention will be described in more detail with reference to embodiments of the present invention shown in the drawings. Figure is an exploded perspective view of the magnetic tape cartridge in accordance with an embodiment of the present invention.

The magnetic tape cartridge 1 comprises a cartridge casing 7 formed by fastening upper and lower casing halves 2 and 3, for instance, by screws and a single reel 4 around which a magnetic tape 20 is wound and which is supported for rotation in the cartridge casing 7. The reel 4 comprises a lower reel and an upper reel 6 bonded together by ultrasonic welding.

The lower reel 5 comprises a cylindrical reel hub 23 around which the magnetic tape 20 is wound and a flange portion 24 extending radially outward from the outer periphery of the lower end of the lower reel 5. The reel hub 23 and the flange portion 24 are integrally formed by synthetic resin molding. A reel plate 8 which attracts and holds a magnetic reel drive means for driving the reel 4 is mounted on the lower surface of the bottom of the reel hub 23. Further a braking gear 23A which is brought into mesh with a braking gear 9A formed on a brake button 9 and prevents rotation of the reel 4 when the magnetic tape cartridge is not being used is formed on the upper surface of the bottom of the reel hub 23. Further, the reel hub 23 is provided with an opening 23B through which a release spindle of a recording and reproducing apparatus in which the magnetic tape cartridge 1 is loaded, e.g., an external memory, is inserted to lift the brake button 9.

The brake button 9 is provided with the braking gear 9A on the side opposed to the reel hub 23 and with a groove 9B on the opposite side. A brake guide projection formed on the upper casing half 2 is fitted in the groove 9B. The brake button 9 is incorporated in the reel hub 23 urged downward by a coiled spring 15 so that the braking gear 9A of the brake button 9 is in mesh with the braking gear 23A of the reel hub 23 to prevent rotation of the reel 4 when the magnetic tape cartridge 1 is not being used. When the magnetic tape cartridge 1 is to be used, the release spindle of the recording and reproducing apparatus lifts upward the brake button 9 overcoming the force of the coiled spring 15 to disengage the braking gears 9A and 23A from each other, whereby the reel 4 is released to be freely rotated.

A tape draw-out opening 26 through which the magnetic tape 20 is drawn out is formed in one side face of the cartridge casing 7. A sliding door 27 for opening and closing the tape draw-out opening 26 is mounted in the cartridge casing 7 to be slidable back and forth in the direction of arrow A parallel to the side wall of the cartridge casing 7 between a closing position where it closes the tape draw-out opening 26 and opening position where it opens the same. The sliding door 27 is urged toward the closing position by a spring member (door spring) (not shown)

Figure 3:
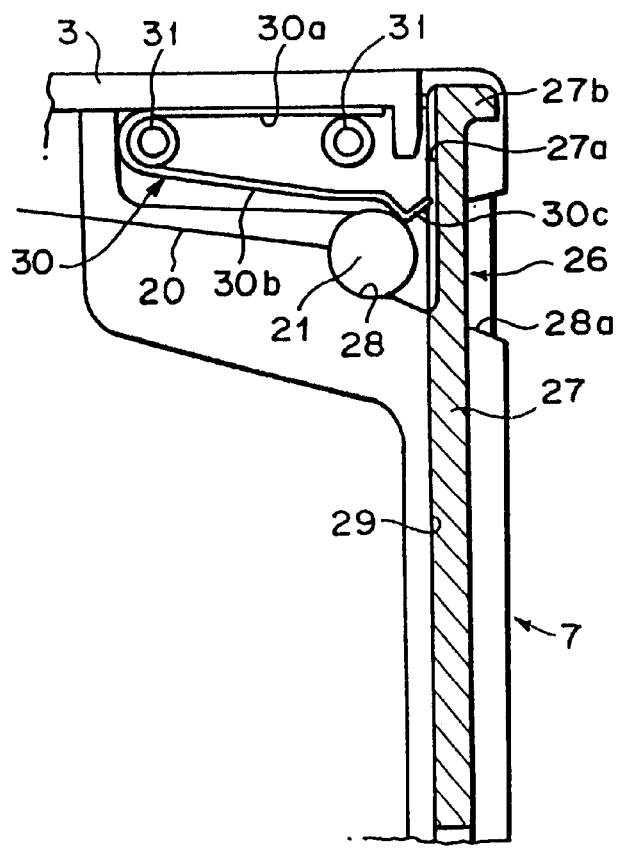
FIG. 3 is a fragmentary plan view partly in cross-section of the part shown in FIG. 2 with the upper half of the cartridge casing removed.

When the magnetic tape cartridge 1 is not being used, a leader pin 21 fixed to the leading end of the magnetic tape 20 is held in a leader pin holding recess 28 formed near the tape draw-out opening 26 with the magnetic tape 20 fully taken up around the reel 4. A pair of guide surfaces 28a (FIG. 3) extend from the leader pin holding recess 28 to flare toward the tape draw-out opening 26 and guide the leader pin 21 into the leader pin holding recess 28.

When the magnetic tape cartridge 1 is loaded in a tape drive system (a recording and reproducing apparatus such as an external memory), the braking gears 9A and 23A. of the brake button 9 and the reel hub 23 are disengaged from each other to permit rotation of the reel 4 as described above, and the magnetic reel drive means attracts the reel plate 8 and rotates the reel 4. Further the sliding door 27 is opened and the leader pin 21 is moved to a predetermined position on the tape running path, whereby the magnetic tape 20 is set in the tape drive system so that data can be recorded on or read out from the magnetic tape 20.

The tape drive system catches the leader pin 21 and sets the magnetic tape 20 to a predetermined tape running path in the system by moving the leader pin 21 to a predetermined position. There is provided a lock member 30 (FIGS. 2 and 3) in the form of a spring which removably holds the leader pin 21 in the leader pin holding recess 28. In order to prevent the leading end portion of the lock member 30 from interfering with the sliding door 27, a recess 27a is formed on the inner surface of the sliding door 27.

Figure 2:
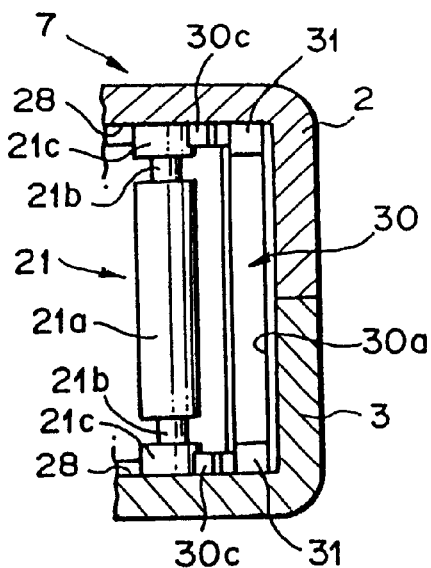
FIG. 2 is a fragmentary cross-sectional view of a part of the magnetic tape cartridge near to the tape draw-out opening.

As shown in FIG. 2, the leader pin 21 comprises a central portion 21a to which the leading end of the magnetic tape 20 is fixed, a pair of small diameter portions 21b which are formed on opposite sides of the central portion 21a and at which the tape drive system catches the leader pin 21, and a pair of flanges 21c formed on opposite ends of the small diameter portions 21b. The flanges 21c are respectively received in the leader pin holding recesses 28 formed on the inner surfaces of the upper and lower casing halves 2 and 3 and are removably held in the recesses 28 by the lock member 30, which is in the form of a plate spring pinched between the upper and lower casing halves 2 and 3.

The lock member 30 is symmetrical about its horizontal axis and is substantially U-shaped in plan. The lock member 30 comprises a plate-like mounting portion 30a which extends along the inner surface of the cartridge casing 7 and held by a pair of mounting bosses 31, upper and lower arm portions 30b which are connected to the rear end of the mounting portion 30a at upper and lower ends thereof by way of bent portions and extend toward the tape draw-out opening 26, and a pair of holding portions 30c formed on the leading end portions of the respective arm portions 30b. The holding portions 30c engage with the flanges 21c of the leader pin 21 and hold the leader pin 21 in the leader pin holding recesses 28. Each of the holding portions 30c projects in a shape like a mountain. When the leader pin 21 is pulled into the cartridge casing 7 through the tape draw-out opening 26, the leader pin 21 abuts against the outer inclined surface of the holding portion 30c to deflect the holding portion 30c, and when the leader pin 21 passes over the peak, the holding portion 30c returns to the original position under the resiliency thereof so that the inner inclined surface abuts against the leader pin 21 and holds the leader pin 21 in the leader pin holding recesses 28.

Recesses 27a are formed on the inner surface of the sliding door 27 at portions opposed to the holding portions 30c of the lock member 30 to extend in the sliding direction of the sliding door like a groove in order to prevent the sliding door 27 from interfering with the holding portion 30c of the lock member 30. The recesses 27a are formed toward the front end of the sliding door 27 through portions opposed to the tips of the holding portions 30c of the lock member 30 when the sliding door 27 is closed so that interference of the sliding door 27 with the lock members 30 can be prevented over the range over which the sliding door 27 moves to open and close the tape draw-out opening 26.

A projection 27b projects outward from the front end of the sliding door 27 and a door opening member of the tape drive system is engaged with the projection 27b to open the sliding door 27. Guide grooves 29 for guiding the upper end lower ends of the sliding door 27 are formed on the upper and lower casing halves 2 and 3.

By virtue of the recesses 27a formed on the inner surface of the sliding door 27, the outer inclined surfaces of the holding portions 30*c* of the lock member 30 can be elongated toward the tape draw-out opening 26 and accordingly can be small in inclination. Further, the outer inclined surfaces of the holding portions 30*c* are extended outward beyond the guide surface 28*a*, whereby fluctuation of "the leader pin introduction position" in the lateral direction can be more allowed.

Figure 4:
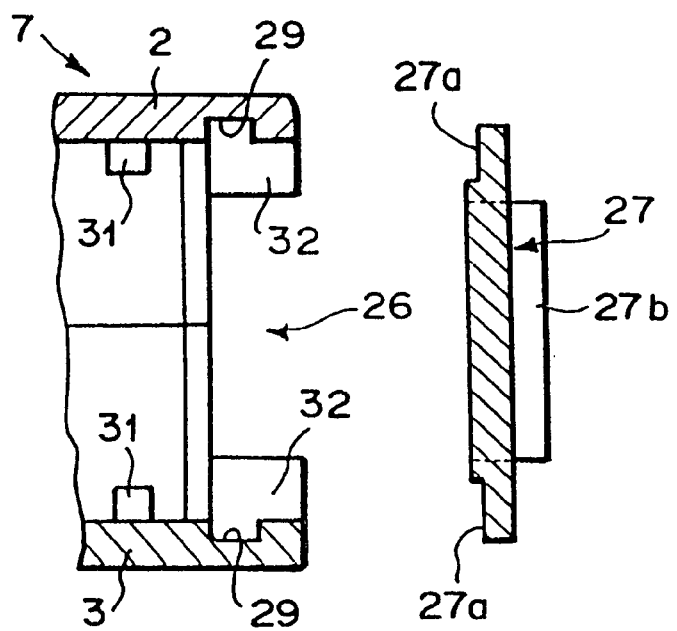
FIG. 4 is a cross-sectional view of the cartridge casing and the sliding door in another embodiment of the present invention.

In another embodiment shown in FIG. 4, a pair of masking portions 32 are formed on the upper and lower casing halves 2 and 3 at the end of the cartridge casing 7 on the side of the tape draw-out opening 26. The masking portions 32 are opposed to the front end face of the sliding door 27 and close the gaps at the front end of the sliding door 27 formed by the recesses 27*a* when the sliding door 27 is closed. The projection 27*b* for opening and closing the sliding door 27 is inserted between the masking portions 32.

In this embodiment, the gaps at the front end of the sliding door 27 formed by the recesses 27*a* are closed by the masking portions 32 when the sliding door 27 is closed, whereby dust and dirt are prevented from entering the cartridge casing 7 when the sliding door 27 is closed and deterioration of recording quality due to dust and/or dirt adhering to the magnetic tape 20 can be prevented.

The lock member 30 need not be limited to those of a plate spring in a unit where the upper and lower portions are integrated but may be modified as desired. For example, the lock member 30 may comprise upper and lower portions separately formed of a plate spring or a wire spring.

Figure 5:
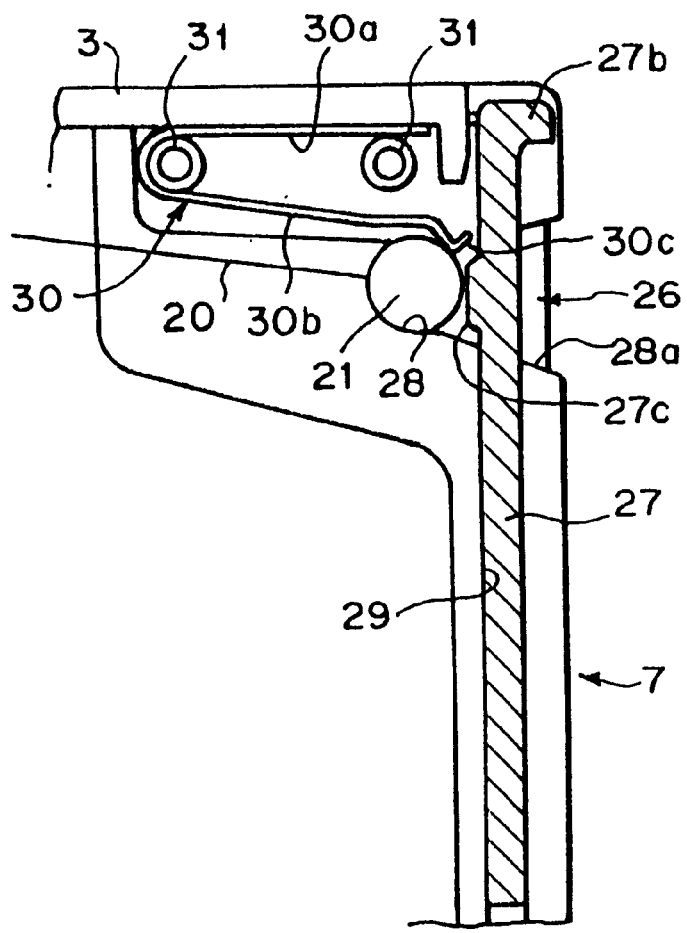
FIG. 5 is a fragmentary plan view partly in cross-section of a part of the magnetic tape cartridge near to the tape draw-out opening with the upper half of the cartridge casing removed showing a modification of the sliding door.
Figure 6:
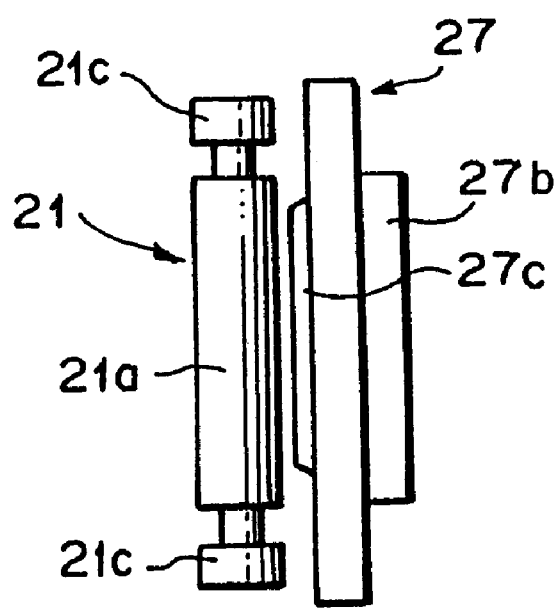
FIG. 6 is a side view showing the sliding door and the leader pin shown in FIG. 5.

FIGS. 5 and 6 show another embodiment of the sliding door. In this embodiment, the basic structure of the magnetic tape cartridge except the sliding door is the same as the preceding embodiments.

In the sliding door 27 of this embodiment, the sliding door 27 is provided on its inner surface with a protrusion 27*c* which prevents the leader pin 21 from being released from the lock members 30 toward the tape draw-out opening 26 when the sliding door 27 is closed.

Specifically, the sliding door 27 is provided at the middle between the upper and lower edges on the inner surface thereof with a protrusion 27*c* which is opposed to the central portion 21*a* of the leader pin 21 to restrict movement of the leader pin 21 when the sliding door 27 is. closed. The height of the protrusion 27*c* is set so that the distance between the top surface of the protrusion 27*c* and the leader pin 21 is not larger than the distance between the center of the leader pin 21 and the contact point of the flange 21*c* and the holding portion 30*c* of the lock member 30 as measured in the. direction of movement of the leader pin 21 toward the opening 26. That is, the height of the protrusion 27*c* is set so that the protrusion 27*c* abuts against the leader pin 21 before the leader pin 21 moves away from the rest position beyond the range in which the lock member 30 can urge the leader pin 21 toward the leader pin holding recesses 28.

Further, the protrusion 27*c* is formed at a distance from the upper and lower edges of the sliding door 27 so that the protrusion 27*c* cannot interfere with the holding portions 30*c* of the lock members 30. The protrusion 27*c* may extend toward the front end of the door 27.

In this embodiment, where the single reel 4 with the magnetic tape 20 wound around the reel 4 is contained for rotation in the cartridge casing 7 and the both ends of the leader pin 21 fixed to the leading end of the magnetic tape 20 are removably held inside the opening 26 of the cartridge casing 7 by the lock members 30, the leader pin 21 can be prevented from being released from the lock members 30 by the protrusion 27*c* even if the leader pin 21 is subjected to a force urging the leader pin 21 away from the rest position, for instance, when the magnetic tape cartridge 1 is dropped on the floor while it is stored or transported with the sliding door 27 closed, whereby the leader pin 21 can be surely caught in the correct position by the tape drive system and reliability of the magnetic tape cartridge can be improved.

Further, since the protrusion 27*c* is formed in a position where it cannot interfere with the lock members 30, opening and closing of the sliding door 27 are stabilized and excellent leader pin holding function of the lock members 30 is ensured.

Figure 7:
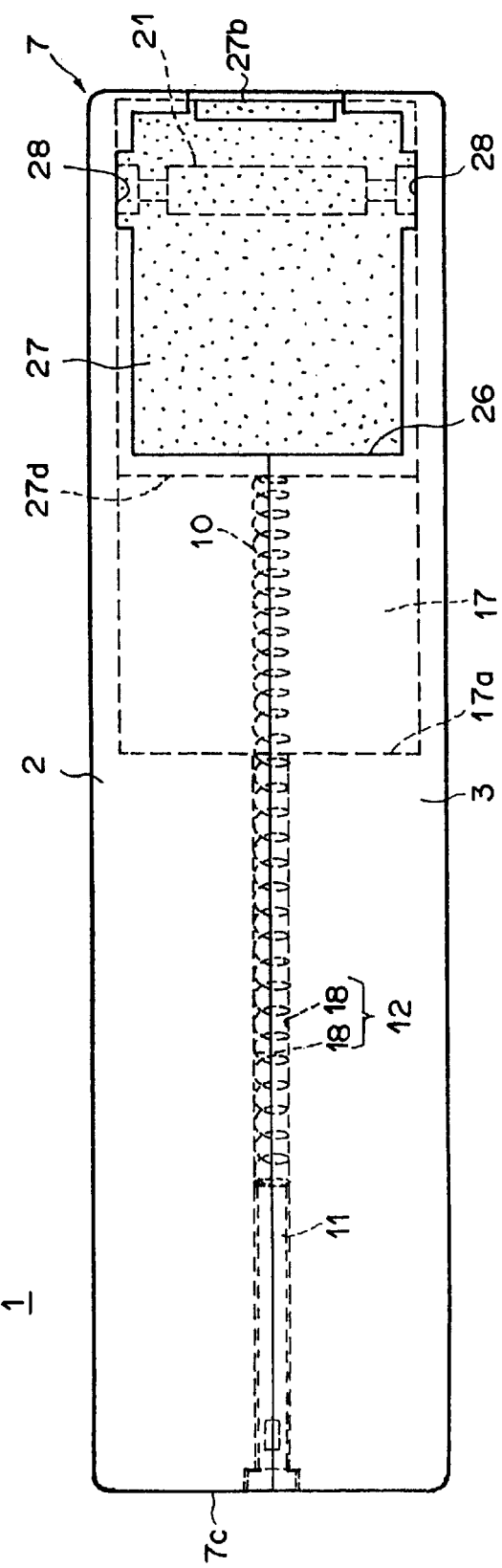
FIG. 7 is a front view of the magnetic tape cartridge showing an embodiment of the sliding door urging structure with sliding door closed.
Figure 8:
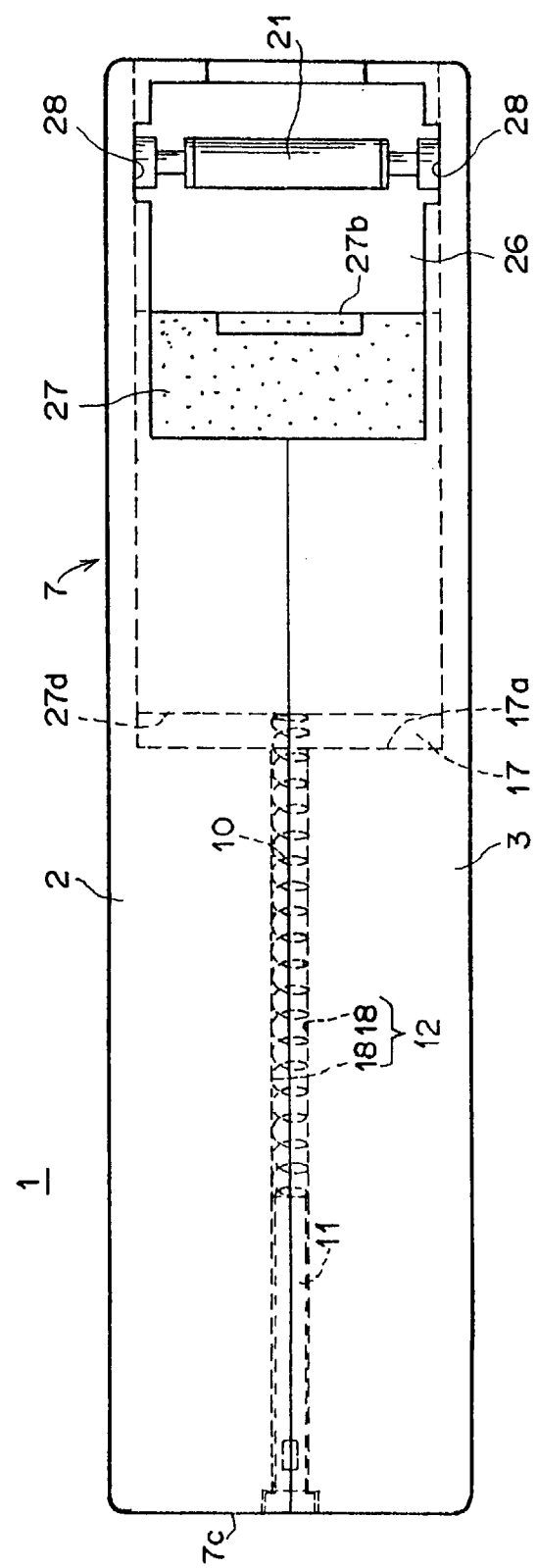
FIG. 8 is a front view similar to FIG. 7 but with the sliding door opened.
Figure 9:
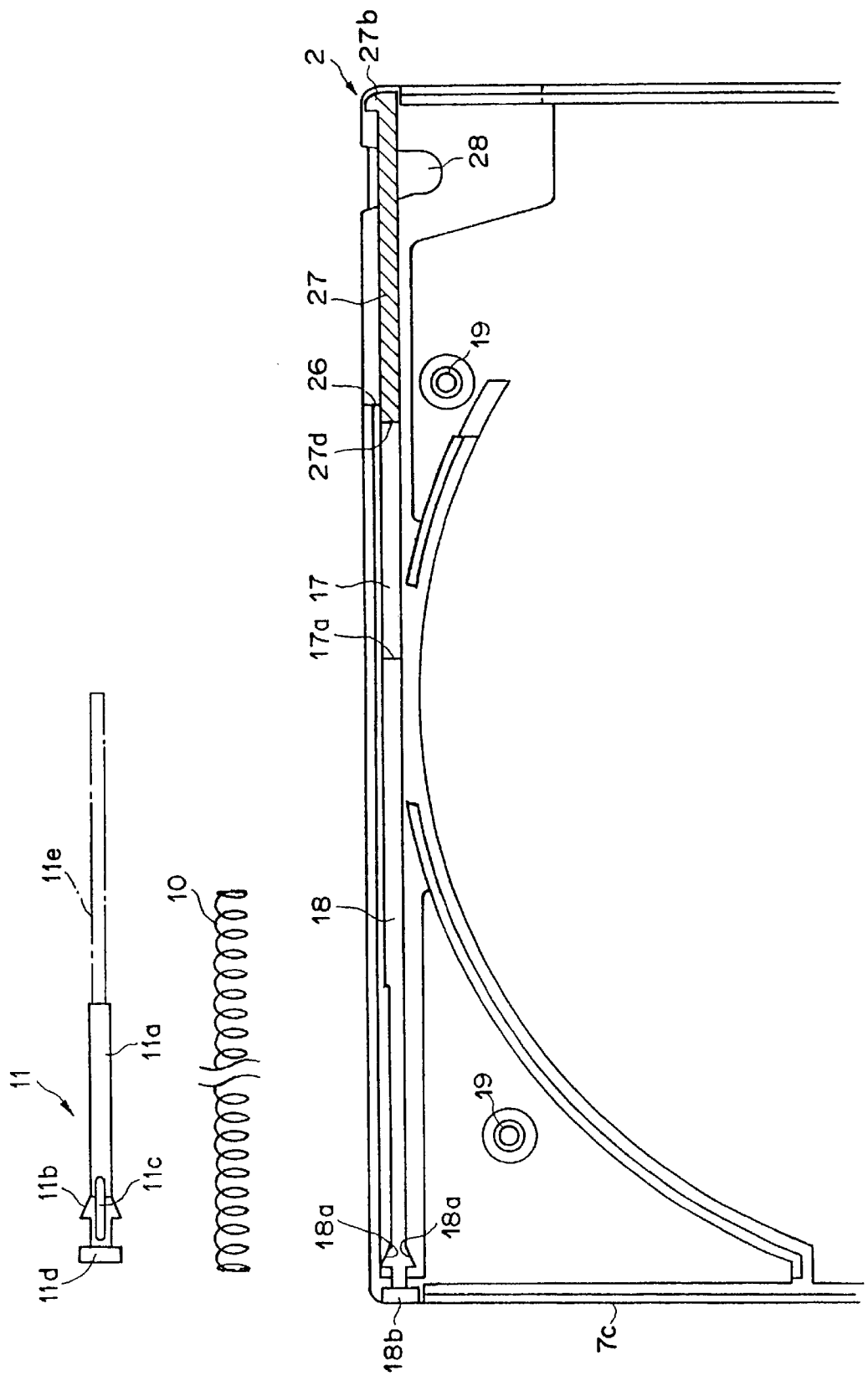
FIG. 9 is an exploded view showing the coiled spring and the plug together with a bottom view of an important part of the upper casing half of the cartridge casing.

FIGS. 7 to 9 show an embodiment of the sliding door urging structure. FIGS. 7 and 8 show front views of the magnetic tape cartridge 1 with the sliding door 27 closed and opened, respectively. FIG. 9 is an exploded view showing a coiled door spring 10 and a plug 11 for urging the sliding door 27 to the closing position together with a bottom view of an important part of the upper casing half 2 of the cartridge casing 7.

A groove 18 is formed on the side wall of the cartridge casing 7, in which the tape draw-out opening 26 is formed, to extend from the rear end surface 17*a* of the sliding passage 17 of the sliding door 27 along the bond area of the upper and lower casing halves 2 and 3 in the door opening direction (away from the sliding door 27) and open in the side wall 7*c* normal to the side wall in which the tape draw-out opening 26 is formed.

The groove 18 may be formed partly on the upper casing half 2 and partly on the lower casing half 3 or entirely on one of the upper and lower casing halves 2 and 3, and when the upper and lower casing halves 2 and 3 are mated together, a hole 12 which opens in the side wall 7*c* and into which the coiled door spring 10 and the plug 11 are inserted is formed.

The upper and lower casing halves 2 and 3 of the cartridge casing 7 are fixed together by screwing bolts into bosses 19. When assembling the cartridge casing 1, for instance, the sliding door 27 and the door spring 10 are first incorporated in the lower casing half 3 and then the upper casing half 2 is placed thereon. Otherwise, the upper and lower casing halves 2 and 3 may be fixed together with only the sliding door 27 incorporated in the lower casing half 3, and then the coiled door spring 10 and the plug 11 may be inserted in sequence in this order into the hole 12 from the side wall 7*c* of the cartridge casing 7.

In either case, when the plug 11 is inserted into the hole 12 from the side wall 7*c* of the cartridge casing 7, the coiled door spring 10 is pushed toward the sliding door 27 and is projected into the sliding passage 17 until it abuts against the read end face 27*d* of the sliding door 27. Then the door spring 10 is compressed by a predetermined amount, whereby initial urging force for urging the sliding door 27 to the closing position is generated.

As shown in FIG. 9, the plug 11 is provided with a pair of wedge-like projections 11*b* on its shaft portion 11*a* near its base end. A slit 11*c* is provided in the shaft portion 11*a* between the projections 11*b* so that the projections 11*b* are collapsible. A larger diameter portion 11*d* is provided at the base end of the shaft portion 11*a* with a shoulder formed between the larger diameter portion 11*d* and the shaft portion 11*a*.

The grooves 18 in the cartridge casing 7 are provided with a pair of recesses 18*a* which conform to the projections lib in shape. A larger diameter portion 18*b* which conforms to the larger diameter portion 11*d* of the plug 11 is formed at the end of the grooves 18 in the side wall of the cartridge casing 7. When the plug 11 is inserted into the hole 12 from the open end after the upper and lower casing halves 2 and 3 are mated together, the projections 11b of the shaft portion 11a of the plug 11 are resiliently engaged with the recesses 18a of the grooves 18 with the larger diameter portion 11d of the plug 11 received in the larger diameter portion 18b of the grooves 18, whereby the plug 11 is held in place in the hole 12.

Figure 10:
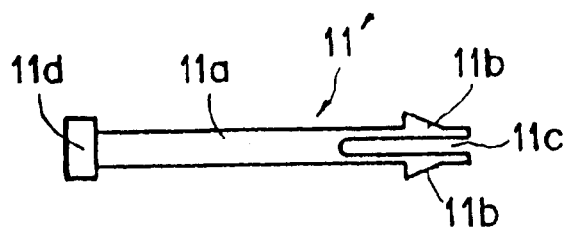
FIG. 10 is an exploded view showing another embodiment of the plug.
Figure 10:
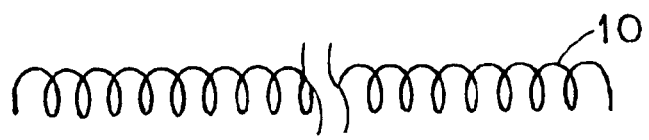
Figure 10:
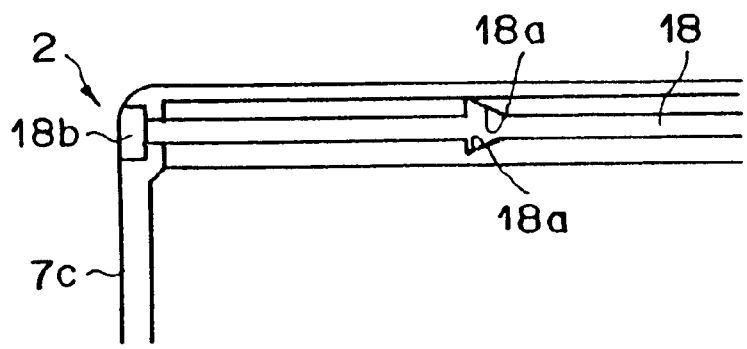

As shown by the chained line in FIG. 9, a smaller diameter portion 11e which is inserted into the coiled spring 10 may be provided on the front end of the shaft portion 11a of the plug 11. Further, as shown in FIG. 10, the projections 11b and the slit 11c may be provided on the front end of the shaft portion 11a of a plug 11' with the recesses 18a of the grooves 18 formed in the grooves 18 in positions corresponding to the positions of the projections 11b.

As can be seen from the description above, in the embodiment described above, force urging the sliding door 27 to the closing position is not generated until the plug 11 which pushes the end of the coiled spring 10 remote from the sliding door 27 is inserted into the hole 12 which is provided to extend from the sliding passage 17 of the sliding door 27 in the direction of opening the sliding door 27. That is, the coiled spring 10 does not provide no urging force to the sliding door 27 until the plug 11 is inserted into the hole 12. Accordingly, assembly of the cartridge casing 7 and incorporation of the sliding door 27 and the coiled spring (spring member) 10 in the cartridge casing 7 are facilitated.

Further, since the spring member for urging the sliding door 27 toward the closing position is coiled spring which extends over the sliding passage 17 of the sliding door 27 and the hole 12 extending rearward from the sliding passage 17 along the mated surfaces of the upper and lower casing halves 2 and 3, the stroke of the spring member can be long enough.

Further, since a pair of resilient projections 11b are formed on the plug 11 with the recesses 18 adapted to be engaged with the projections 11b formed in the grooves 18 and the plug 11 is held in place by simply inserting the plug 11 into the hole 12, the plug 11 can be very easily incorporated in the cartridge casing 7.

Figure 11A:
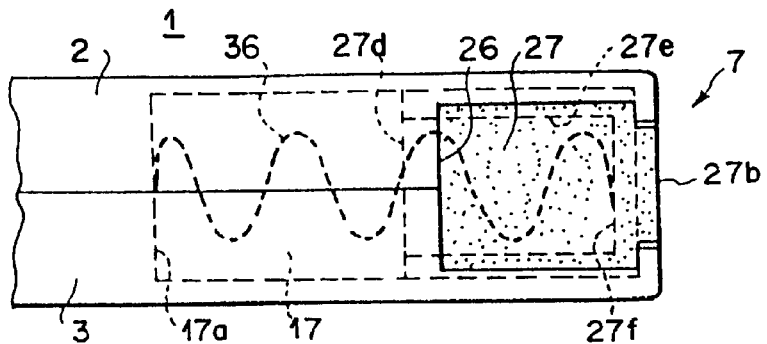
FIG. 11A is a schematic front view of the magnetic tape cartridge showing a spring member of a first embodiment with the sliding door closed.
Figure 11B:
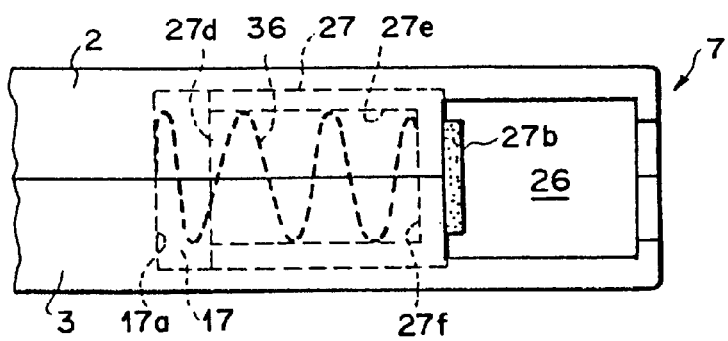
FIG. 11B is a front view similar to FIG. 11A but with the sliding door opened.
Figures 12A, 12B:
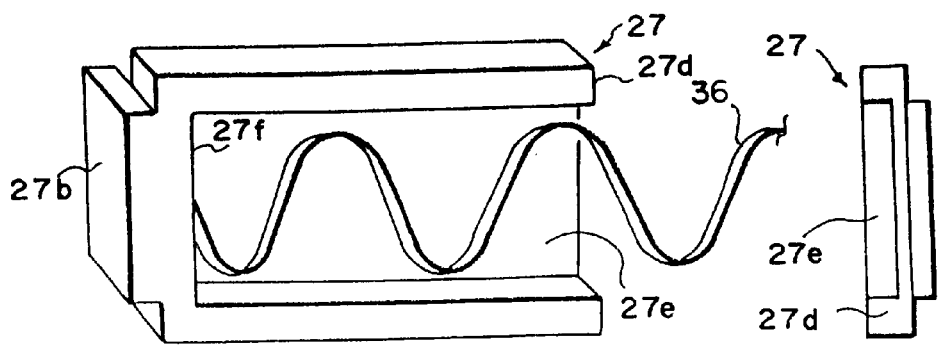
FIG. 12A is a perspective view of the sliding door shown in FIG. 11A as seen from the rear.
FIG. 12B is a side view of the sliding door shown in FIG. 11A as seen from the rear.

Various embodiments of the spring member for urging the sliding door 27 will be described in sequence with reference to the FIGS. 11A to 45C, hereinbelow. FIG. 11A is a schematic front view of the magnetic tape cartridge showing a spring member of a first embodiment with the sliding door closed, FIG. 11B is a front view similar to FIG. 11A but with the sliding door opened, FIG. 12A is a perspective view of the sliding door shown in FIG. 11A as seen from the rear, and FIG. 12B is a side view of the sliding door shown in FIG. 11A as seen from the rear.

In this embodiment, the sliding door 27 is urged toward the closing position and held there by a corrugated door spring 36 disposed in the sliding passage 17 of the sliding door 27. inside the cartridge casing 7. As shown in FIGS. 12A and 12B, the sliding door 27 is provided with a recess 27e which extends toward a projected portion 27b of the sliding door 27 from the read end 27d. The front half of the corrugated door spring 36 is inserted into the recess 27e with the rear end of the door spring 36 abutting against the rear inner surface 17a of the sliding passage 17 and the front end of the door spring 36 abutting against the front inner surface 27f of the recess 27e.

With this arrangement, even in the state where the sliding door 27 is opened and the distance between the rear end 27d of the sliding door 27 and the rear inner surface 17a of the sliding passage 17 is shortened, the door spring 36 can exhibit a desired urging force.

A recess 27g which opens only in the rear end face 27d of the sliding door 27 as shown in FIGS. 13A and 13B may be formed instead of the recess 27e which opens both in the rear end face 3b and a side face of the sliding door 27 and the front half of the door spring 36 may be inserted into the recess 27g.

In a second embodiment of the door spring shown in FIG. 14, a cutaway portion 27h is formed on an upper part of the sliding door 27 and the front half of a coiled door spring 38 is placed on the cutaway portion 27h. The front end of the door spring 38 is in abutment against the front end face 27f of the cutaway portion 27h and the rear end of the door spring 38 is in abutment against a wall portion 39 formed on the upper casing half 2. Reference numeral 40 denotes a rib for tacking the door spring 38. Also in this embodiment, it is clear that the effect similar to that of the first embodiment can be obtained.

Figure 15A:
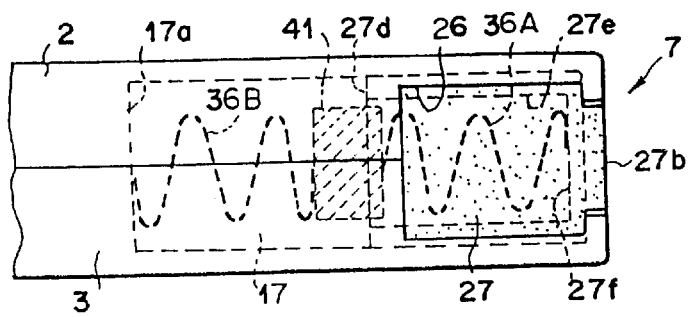
FIG. 15A is a schematic front view of the magnetic tape cartridge showing a spring member of a third embodiment with the sliding door closed.
Figure 15B:
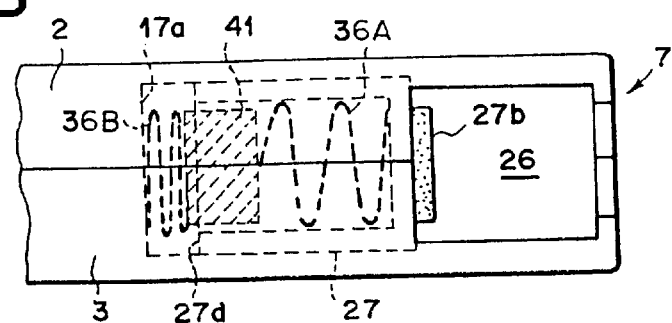
FIG. 15B is a front view similar to FIG. 15A but with the sliding door opened.

FIG. 15A is a schematic front view of the magnetic tape cartridge showing a spring member of a third embodiment with the sliding door closed and FIG. 15B is a front view similar to FIG. 15A but with the sliding door opened.

The third embodiment shown in FIGS. 15A and 15B is differs from the first embodiment shown in FIGS. 11A and 11B in that the door spring is formed by a pair of spring members 36A and 36B connected in series with a slide plate 41 intervening therebetween and the front spring member 36A is larger that the rear spring member 36B in the urging force.

In this embodiment, when the sliding door 27 is opened overcoming the force of the door springs 36A and 36B, the rear spring member 36B, which is weaker than the front spring member 36A, is first compressed and then the front spring member 36A is compressed, whereby a relatively constant spring characteristic can be obtained over the entire stroke of the sliding door 27, and adjustment of the door opening force can be facilitated.

Figure 16A:
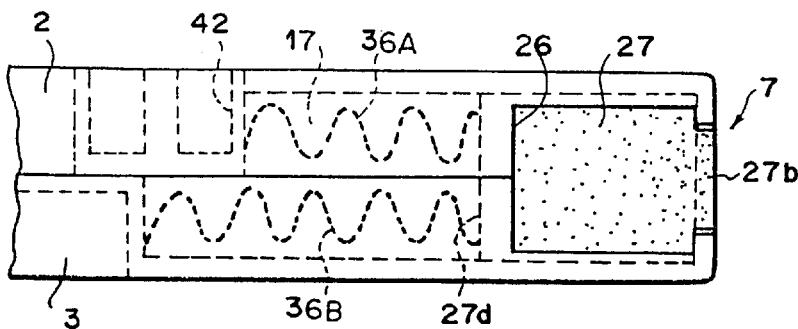
FIG. 16A is a schematic front view of the magnetic tape cartridge showing a spring member of a fourth embodiment with the sliding door closed.
Figure 16B:
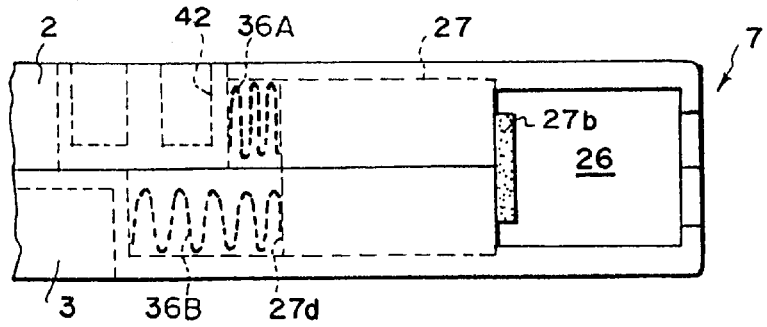
FIG. 16B is a front view similar to FIG. 16A but with the sliding door opened.

FIG. 16A is a schematic front view of the magnetic tape cartridge showing a spring member of a fourth embodiment with the sliding door closed, and FIG. 16B is a front view similar to FIG. 16A but with the sliding door opened. In the fourth embodiment shown in FIGS. 16A and 16B, the door spring is formed by a pair of spring members 36A and 36B which are disposed in parallel in the passage 17 of the sliding door 27 and the upper spring member 36A is shorter than the lower spring member 36B.

In this embodiment, for example when an obstacle such as a recess 42 exists in the upper casing half 2, a short and narrow spring member 36A is disposed in the upper casing half 2 and a long and narrow spring member 36B is disposed in the lower casing half 3, whereby a desired urging force is obtained in total.

Figure 17A:
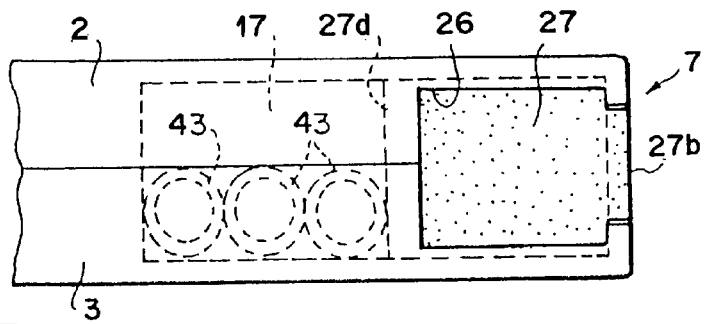
FIG. 17A is a schematic front view of the magnetic tape cartridge showing a spring member of a fifth embodiment with the sliding door closed.
Figure 17B:
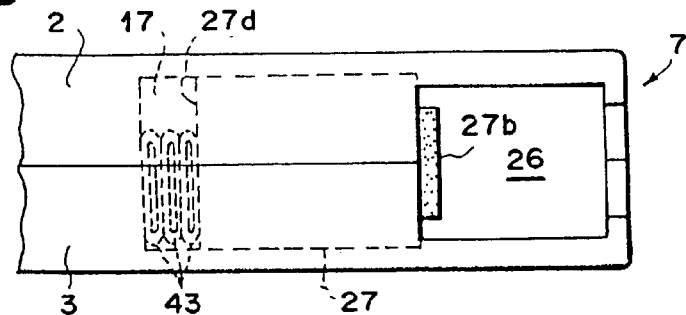
FIG. 17B is a front view similar to FIG. 17A but with the sliding door opened.

FIG. 17A is a schematic front view of the magnetic tape cartridge showing a spring member of a fifth embodiment with the sliding door closed, and FIG. 17B is a front view similar to FIG. 17A but with the sliding door opened. In the fifth embodiment shown in FIGS. 17A and 17B, the door spring is formed by a plurality (three in the illustrated embodiment) of elastic rings 43 such as rubber rings arranged in series in the sliding passage 17.

The elastic rings are easy to produce and since they keeps an urging force until they compressed flat as shown in FIG. 17B, a door spring having a long stroke and a desired urging force can be easily obtained.

Figure 18A:
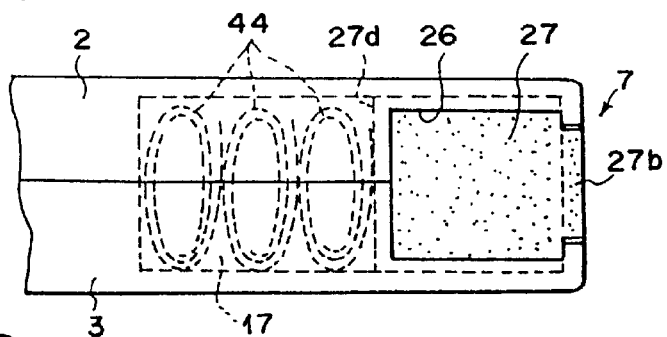
FIG. 18A is a schematic front view of the magnetic tape cartridge showing a spring member of a sixth embodiment with the sliding door closed.
Figure 18B:
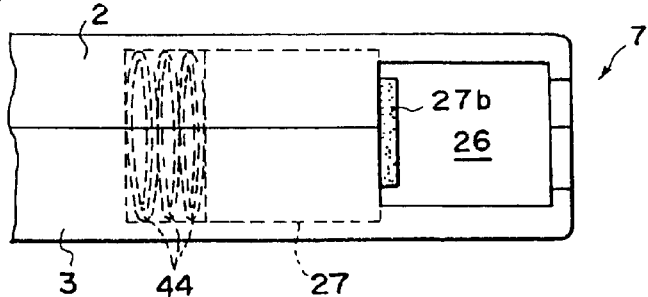
FIG. 18B is a front view similar to FIG. 18A but with the sliding door opened.

FIG. 18A is a schematic front view of the magnetic tape cartridge showing a spring member of a sixth embodiment with the sliding door closed, and FIG. 18B is a front view similar to FIG. 18A but with the sliding door opened.

The sixth embodiment shown in FIGS. 18A and 18B is similar to the fifth embodiment but a plurality of helical elastic members 44 are employed in place of the elastic rings 43. Also in this embodiment, it is clear that the effect similar to that of the fifth embodiment can be obtained.

FIGS. 19A to 19D are schematic front views of the magnetic tape cartridge showing a spring member of a seventh embodiment. FIG. 19A shows the state where the sliding door 27 is in the closing position and FIGS. 19B to 19D show various stages of moving the sliding door to the opening position.

In this embodiment, a corrugated wire spring 46 having a pair of coiled portions 46a and 46b is used as a door spring instead of the corrugated plate spring 36 in the first embodiment. In FIGS. 19A to 19D and the following drawings, the sliding passage 17 is shown opened for the purpose of convenience of explanation.

In this embodiment, when the sliding door 27 is opened and as the wire spring 46 is increasingly compressed, bent portions of the wire spring 16 are rotated about the coiled portions 46a and 46b and come to cross each other as shown in FIGS. 19B to 19D, whereby a long stroke can be obtained.

The wire spring 46 may be provided with a single or three or more coiled portions. By changing the number of the coiled portions, a spring member 46 having a desired spring characteristics can be obtained. Further by changing the number of turns of the coiled portion, a spring member 46 having a desired spring characteristics can also be obtained.

Figure 22:
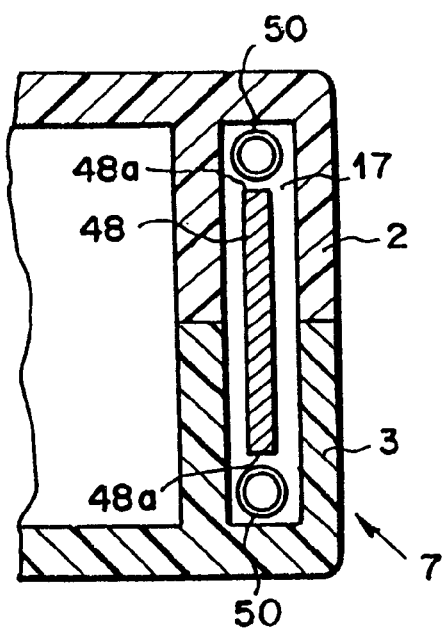
FIG. 22 is a cross-sectional view taken along line XIV—XIV in FIG. 20A.
Figure 23:
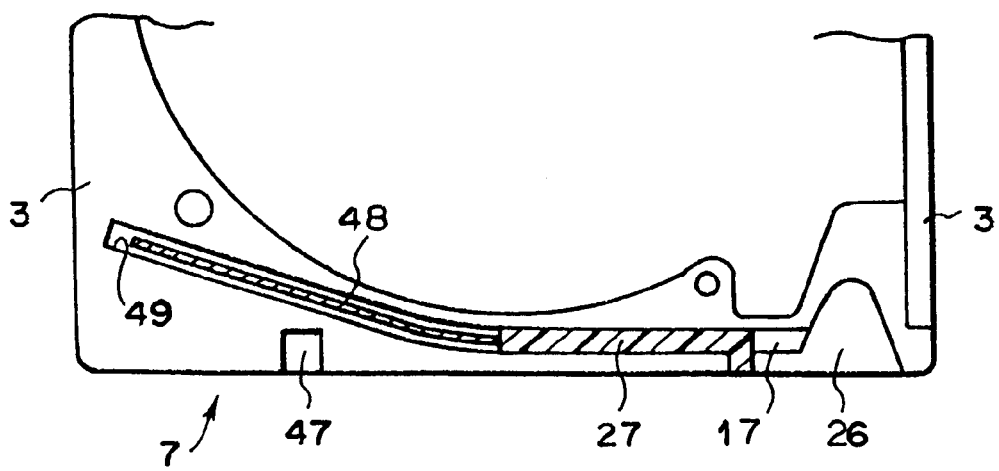
FIG. 23 is a cross-sectional view taken along line XV—XV in FIG. 20B.

FIG. 20A is a schematic front view of the magnetic tape cartridge showing a spring member of an eighth embodiment with the sliding door closed, FIG. 20B is a front view similar to FIG. 20A but with the sliding door opened, FIG. 21 is a perspective view of a sliding door with a spring retainer plate, FIG. 22 is a cross-sectional view taken along line XIV—XIV in FIG. 20A, and FIG. 23 is a cross-sectional view taken along line XV—XV in FIG. 20B. In this embodiment, a pair of coiled springs 50 are employed as the door spring.

Since the sliding door 27 is slid over a relatively long distance, there is fear that the coiled springs 50 buckles when the sliding door 27 is opened. In this embodiment, buckling of the coiled springs 50 is prevented by mounting a spring retainer plate 48 on the rear end of the sliding door 27.

That is, as shown in FIG. 21, the spring retainer plate 48 has upper and lower edges 48a which are substantially parallel to the direction of sliding movement of the sliding door 27 and is mounted on the rear end of the sliding door 27 to extend in the sliding passage 17. Further, the sliding passage 17 is provided with an extension 49 which extends away from the sliding door 27.

The spring retainer plate 48 is narrower than the sliding door 27 and is inserted into the extension 49. Then as shown in FIG. 22, the coiled springs 50 are contained in the spaces surrounded by the upper and lower edges 48a of the spring retainer plate 48 and the walls of the sliding passage 17.

Accordingly, even if the coiled springs 50 are compressed in response to opening the sliding door 27, the coiled springs 50 cannot buckle and can keep their longitudinal axes in the direction of sliding movement of the sliding door 27.

Further since a locator notch 47 and the like are generally positioned behind the sliding passage 17, the extension 49 is curved inward to clear the notch 47 and the spring retainer plate 48 is formed of a flexible material so that it can slide along the curved extension 49 as shown in FIG. 23.

FIG. 24A is a schematic front view of the magnetic tape cartridge showing a spring member of a ninth embodiment with the sliding door closed, FIG. 24B is a front view similar to FIG. 24A but with the sliding door opened, and FIG. 25 is an enlarged cross-sectional view taken along line XVII—XVII in FIG. 24A.

In this embodiment, a single coiled spring 50 is employed as the door spring. A pair of grooves 51 are formed on opposite side walls of the sliding passage 17 opposed to each other as shown in FIG. 25. BY the grooves 51, a space for containing the coiled spring 50 having a width b larger than the space a between the side walls is defined and the coiled spring 50 is contained in the space.

Figure 26A:
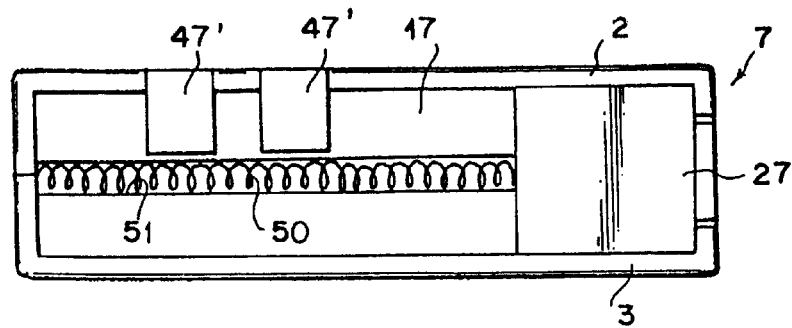
FIG. 26A is a view for illustrating the effect of the ninth embodiment.

With this arrangement, not only buckling of the coiled spring 50 is prevented but also freedom of selecting the coiled spring 50 is increased since a coiled spring larger than the space a in diameter can be used. Further even if notches 47' for locating or handling the magnetic tape cartridge are disposed behind the sliding passage 17 and the stroke is limited when the bending type corrugated wire spring 46 shown in FIG. 19 is employed, the coiled spring 50 can extend along the entire length of the cartridge casing 7 as shown in FIG. 26.

The grooves 51 may be formed between the upper and lower casing halves 2 and 3. However, by forming a main part of the groove 51 in one of the upper and lower casing halves 2 and 3 as shown in FIG. 25, the cartridge casing 7 can be assembled with the coiled spring 50 held in the casing half where the main part of the groove 51 is formed, and assembly of the cartridge casing 7 is facilitated.

Figure 27A:
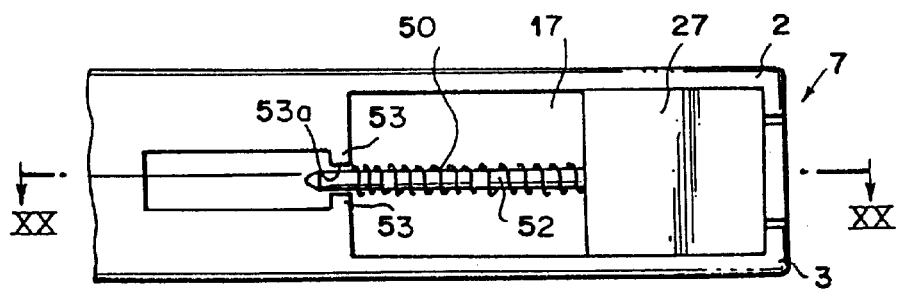
FIG. 27A is a schematic front view of the magnetic tape cartridge showing a spring member of a tenth embodiment with the sliding door closed.
Figure 27B:
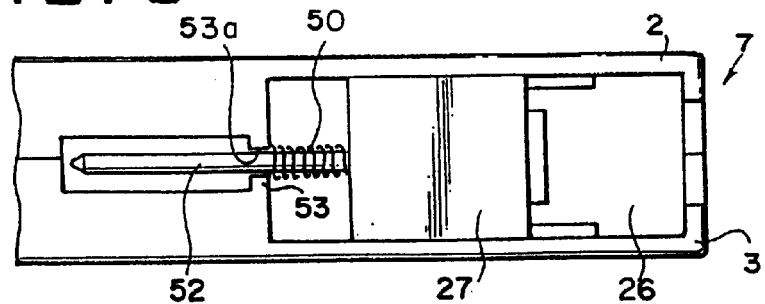
FIG. 27B is a front view similar to FIG. 27A but with the sliding door opened.
Figure 28:
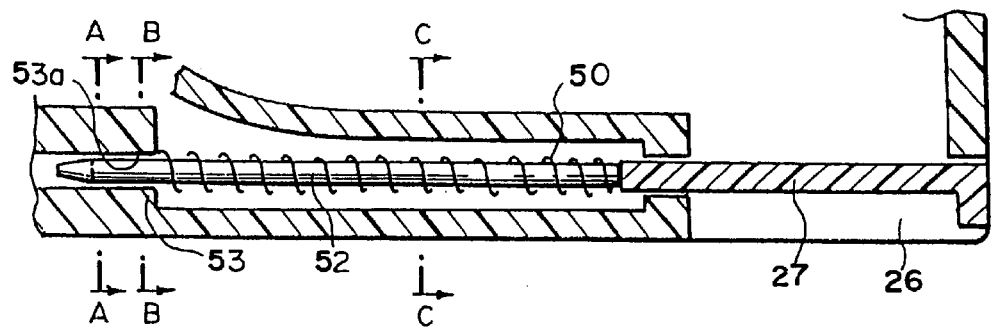
FIG. 28 is a cross-sectional view taken along line XX—XX in FIG. 27A.

FIG. 27A is a schematic front view of the magnetic tape cartridge showing a spring member of a tenth embodiment with the sliding door closed, and FIG. 27B is a front view similar to FIG. 27A but with the sliding door opened. FIG. 28 is an enlarged cross-sectional view taken along line XX—XX in FIG. 27A, and FIGS. 29A to 29C are cross-sectional views respectively taken along lines A—A, B—B and C—C in FIG. 28.

Also in this embodiment, a coiled spring 50 is also employed. That is, a spring support rod 52 extends rearward from the read end 27d of the sliding door 27 and the coiled spring 50 is fitted on the rod 52.

Also in this embodiment, it is preferred that a space for containing the coiled spring 250 having a width larger than the space between the side walls of the sliding passage 17 be provided. A wall 53 is formed in the cartridge casing 7 to form a spring seat behind the sliding passage 17 and the spring support rod 52 is inserted into an axial hole 53a formed in the wall 53. It is preferred that the spring support rod 52 be provided with a pair of flat surfaces on opposite sides thereof and the axial hole 53a conforms to the rod 52 in shape as shown in FIG. 29A to 29C. With this arrangement, the end of the coiled spring 52 is prevented from entering the space between the axial hole 53a and the rod 52 and since the area of the spring seat is increased, the end of the coiled spring 50 can be stably supported.

By virtue of the spring support rod 52, the coiled spring 50 can be easily incorporated in, for instance, the lower casing half 3 as shown in FIG. 30A. However without the spring support rod 52, the coiled spring 50 is apt to buckle as shown in FIG. 30B when incorporating in the lower casing half 3, which makes difficult incorporation of the coiled spring 50.

When a recess 27e is formed on the rear end face of the sliding door 27, the spring support rod 52 is projected from the bottom surface 27f of the recess 27e, and the coiled spring 50 is fitted on the rod 52 with one end in contact with the bottom surface 27f and the other end in contact with the inner wall surface 7a of the cartridge casing 7 as shown in FIGS. 31 and 32, the stroke of the coiled spring 50 can be increased and the freedom of selecting the coiled spring can be enlarged.

Further by providing a tacking projection 52a on the tip of the spring support rod 52 as shown in FIG. 33 and tacking the coiled spring on the rod 52, incorporation of the coiled spring 50 is further facilitated. When the tip portion of the rod 52 is smaller in diameter than the body portion of the rod 52, fitting the coiled spring on the rod 52 by an automated assembling system is facilitated.

It is preferred than the tacking projection be bifurcated into a pair of resilient pieces 52b as shown in FIG. 34A. In this case, the rod 52 can be easily inserted into the axial hole 53a by virtue of resilient deformation of the resilient pieces 52b even if the axial hole 53a is small as shown in FIG. 34B, and after the rod 52 is inserted into the axial hole 53a, the end of the spring 50 comes to be rest on the wall 53 forming a spring seat.

The axial holes 53a may be of such a diameter that permits insertion of the rod 52 without deformation of the resilient pieces 52b as shown in 34C. Also in this case, by providing the spring support rod 52 with a pair of flat surfaces on opposite sides thereof and shaping the axial hole 53a to conform to the rod 52 in shape, the end of the coiled spring 50 can be stably supported by the wall 53.

Further by providing the coiled spring 50 with a plurality of close winding portions 50a as shown in FIG. 35, rigidity of the coiled spring 50 is increased, which contributes to prevention of buckling of the coiled spring 50.

Though it is preferred that the spring support rod 52 be formed integrally with the sliding door 27 so that the number of parts is reduced, the rod 52 may be formed separately from the sliding door 27 as shown in FIGS. 36A to 36C. FIG. 36A is a fragmentary plan view of an important part of the rod 52, FIG. 36B is a side view of the rod 52 and FIG. 36C is a fragmentary cross-sectional view of an important part of the sliding door 27. The rod 52 comprises a body portion 52c having a tip portion such as shown in FIGS. 34A to 34C, a small diameter portion 52d formed near the base end of the body portion 52c and a base end portion 52e connected to the small diameter portion 52d. The base end portion 52e is provided with a pair of flat portions on opposite sides thereof as shown in FIG. 36B in order to prevent rotation of the rod 52. The rear end portion of the sliding door 27 is provided with an engagement recess 54 which conforms to the shape of the base end portion 52e of the rod 52 as shown in FIG. 36C. After the coiled spring 50 is fitted on the rod 52 from the base end portion 52e, the base end portion 52e is brought into engagement with the recess 54 of the sliding door 27 from above, whereby the rod 52 is fixed to the sliding door 27 as shown in FIG. 37.

Figure 38:
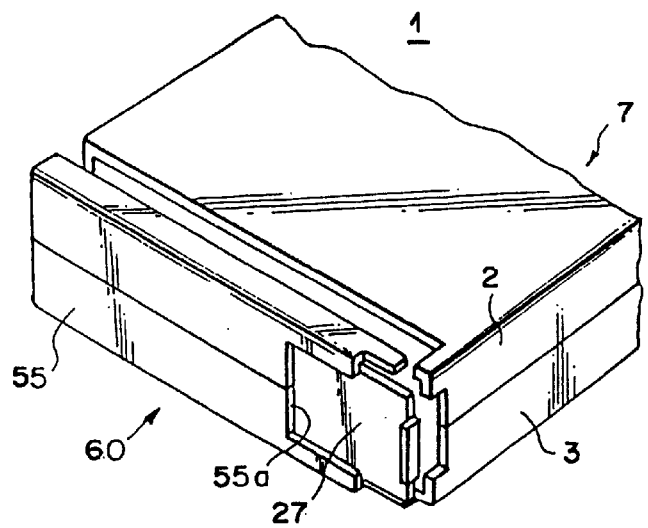
FIG. 38 is a perspective view of the magnetic tape cartridge showing a spring member of an eleventh embodiment.
Figure 39A:
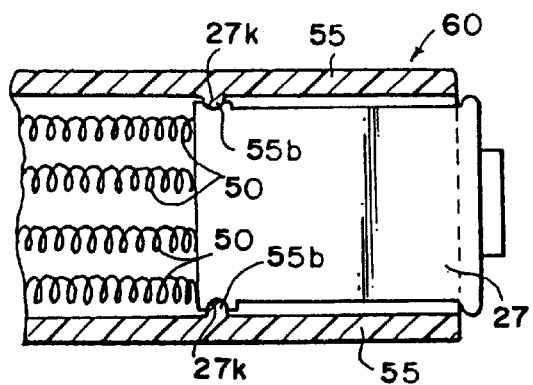
FIG. 39A is a cross-sectional view showing the door unit shown in FIG. 38A in a state where the sliding door is tacked.
Figure 39B:
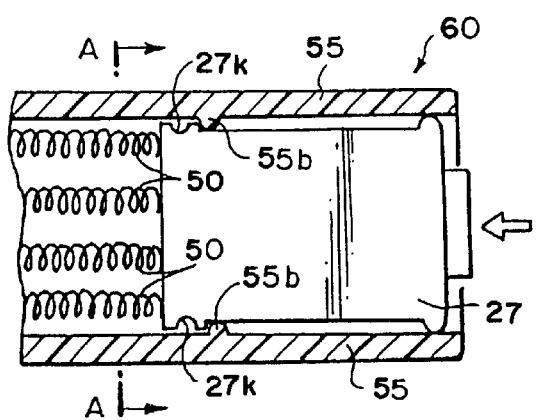
FIG. 39B is a cross-sectional view showing the door unit in a state where the sliding door is released.
Figure 40:
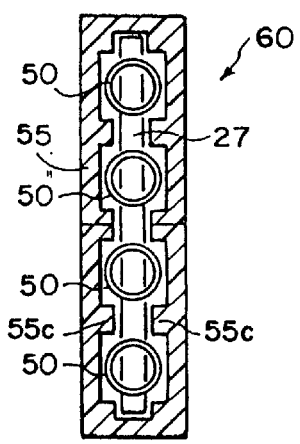
FIG. 40 is a cross-sectional view taken along line A—A in FIG. 39B.

FIGS. 38 to 40 are views showing a spring member of an eleventh embodiment. FIG. 38 is a perspective view showing incorporation of a door unit in the cartridge casing, FIG. 39A is a front cross-sectional view showing the door unit in a state where the sliding door is in a tacked state, FIG. 39B is a front cross-sectional view showing the door unit in a state where the sliding door is slidable, and FIG. 40 is an enlarged cross-sectional view taken along line A—A in FIG. 39B.

In this embodiment, the side walls of the cartridge casing 7 on which the sliding door 27 is to be mounted is removed and a door unit 60 is mounted on the side of the cartridge casing 7. The door unit 60 comprises a casing 55, a sliding door 27 and a plurality of coiled springs 50 incorporated in the casing 55 and is fixed to the cartridge casing 7 by bonding or press-fitting. The casing 55 is provided with an opening 55a which forms the tape draw-out opening 26.

The door unit 60 is provided with a tacking mechanism for holding the sliding door 27 not to be ejected from the casing 55 under the force of the coiled springs 50 after the coiled springs 50 are incorporated in the casing 55.

As shown in FIGS. 39A and 39B, the tacking mechanism comprises a pair of engagement projections 55b formed on the top surface and the bottom surface of the sliding passage 17 and a pair of engagement recesses 27k formed on the upper and lower edges of the sliding door 27. After the coiled springs 50 are incorporated in the sliding passage, the sliding door 27 is inserted into the sliding passage from the opening at the right side end of the casing 55 to a position where the engagement projections 55b and the engagement recesses 27k are brought into engagement with each other as shown in FIG. 39A. Thus the sliding door 27 is tacked and the door unit 60 is incorporated in the cartridge casing 7 in this state. Then by pushing leftward the sliding door 27 to disengage the engagement projections 55b and the engagement recesses 27k from each other as shown in FIG. 39B, the sliding door 27 comes to be slidable.

In order to more stabilize the sliding movement of the sliding door 27, a plurality of ribs 55c extending in the direction of the sliding movement of the sliding door 27 are formed on opposite sides of the sliding passage as shown in FIG. 40.

In this embodiment, since the door unit 60 comprising the sliding door 27 and the springs 50 which has been incorporated in the casing 55 is mounted on the cartridge casing 7, the spring member can be easily mounted. Further, since the door unit 60 has a sliding door tacking mechanism, the door unit 60 can be easily mounted on the cartridge casing 7.

Figure 41A:
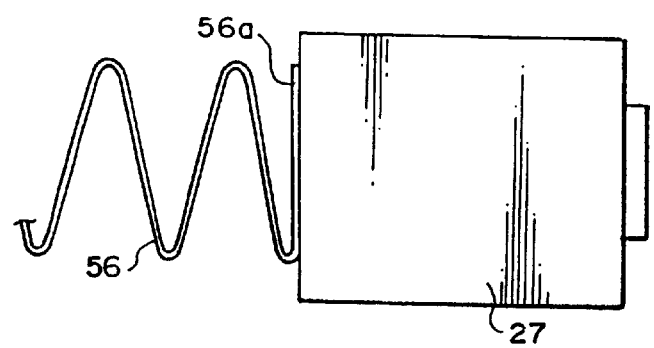
FIG. 41A is a front view of a spring member of a twelfth embodiment.
Figure 41B:
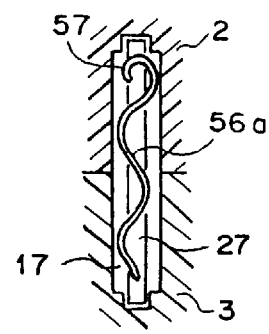
FIG. 41B is a cross-sectional view of the door spring shown in FIG. 41A assembled in the sliding door.

When a corrugated wire spring 56 such as shown in FIG. 41A is employed as the door spring, there is fear that the end of the spring 56 can enter the gap between the sliding door 27 and the cartridge casing 7. In the twelfth embodiment, in order to prevent the end portion of the wire spring 56 from entering the space between the sliding door 27 and the inner surface of the cartridge casing 7, the end portion of the wire spring 56 is bent along the rear end face of the sliding door 27 to form a bent portion 57 as shown in FIG. 41B.

In the thirteenth embodiment shown in FIGS. 42A and 42B, a coiled spring 58 provided with an annular portion which is of a rectangle or ellipsoid conforming to the cross-sectional shape of the sliding door 27 as shown in FIG. 42B is employed as the door spring. With this arrangement, buckling of the coiled spring 58 is prevented and incorporation of the spring 58 is facilitated.

FIGS. 43A, 43B and 44 are views showing a spring member of a fourteenth embodiment, FIGS. 43A and 43B being front views showing the sliding door and the spring member and FIG. 44 being an exploded perspective view of the spring member.

In the this embodiment, the door spring is formed by a coiled spring 62 and a plate spring 61 is connected to one end (FIG. 43A) or each end (FIG. 43B) of the coiled spring 62. The plate spring 61 comprises a central portion 61a provided at its center with an engagement projection 61b with which the end of the coiled spring 62 is engaged and a pair of wings 61c which extend toward the sliding door 27 from opposite ends of the central portion 61a. The end portions of the wings 61c are engaged with engagement projections 27m formed on the upper and lower edges of the sliding door 27.

In this embodiment, the coiled spring 62 may be smaller in length by the length of the plate spring 61 and the coiled spring 62 becomes less apt to buckle. Further freedom in designing the door spring is increased by combination of the coiled spring 62 and the plate spring 61.

That is, in the case where only a coiled spring used, the relation between the urging force of the spring and the displacement of the spring is linear as shown in fig. 45a whereas, in the case of a combination of a coiled spring and a plate spring or plate springs, the relation is represented by a broken line as shown in figs. 45b and 45c, which increases freedom in designing the door spring.

What is claimed is:

1. A magnetic tape cartridge comprising a cartridge casing, a single reel which is housed in the cartridge casing for rotation and around which a magnetic tape is wound, a leader pin which is fixed to the leading end of the magnetic tape in order to draw out the magnetic tape from the cartridge casing, a lock member which is adapted to removably hold opposite ends of the leader pin inside an opening of the cartridge casing, and a sliding door for opening and closing the opening, wherein the inner surface of the sliding door is provided with a protrusion which prevents the leader pin from being released from the lock member in a state where the sliding door is closed.

2. A magnetic tape cartridge as defined in claim 1, in which the height of the protrusion is set so that the distance between the top surface of the protrusion and the leader pin is not larger than the distance between the center of the leader pin and the contact point of the leader pin and the lock member as measured in the direction of movement of the leader pin toward the opening.

3. A magnetic tape cartidge as defined in claim 1 in which the protrusion is formed in a position where the protrusion cannot interfere with the lock member.

4. A magnetic tape cartridge as defined in claim 1 in which the protrusion extends toward the front end of the sliding door.

* * * * *